(12) United States Patent
De Feo et al.

(10) Patent No.: US 12,309,298 B2
(45) Date of Patent: May 20, 2025

(54) METHOD AND CORRESPONDING SYSTEM FOR CONTROLLING SECURE EXECUTION OF OPERATIONS BY INTERCONNECTED DEVICES

(71) Applicant: SICPA HOLDING SA, Prilly (CH)

(72) Inventors: Oscar De Feo, Lausanne (CH); Lorenzo Sirigu, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 211 days.

(21) Appl. No.: 18/258,127

(22) PCT Filed: Dec. 16, 2021

(86) PCT No.: PCT/EP2021/025509
§ 371 (c)(1),
(2) Date: Jun. 16, 2023

(87) PCT Pub. No.: WO2022/128160
PCT Pub. Date: Jun. 23, 2022

(65) Prior Publication Data
US 2024/0073039 A1    Feb. 29, 2024

(30) Foreign Application Priority Data
Dec. 17, 2020   (EP) .................................... 20215163

(51) Int. Cl.
*H04L 9/32*        (2006.01)

(52) U.S. Cl.
CPC .......... *H04L 9/3271* (2013.01); *H04L 9/3213* (2013.01); *H04L 9/3247* (2013.01)

(58) Field of Classification Search
CPC . G06F 21/335; G05B 19/406; G05B 19/4185; G05B 2219/24167;
(Continued)

(56) References Cited

U.S. PATENT DOCUMENTS

2012/0117380 A1    5/2012  Herberth et al.
2019/0197518 A1*   6/2019  Puehse ............... G06Q 20/3278
(Continued)

OTHER PUBLICATIONS

M. Sabt, M. Achemlal, A. Bouabdallah: "Trusted Execution Environment: What It is, and What It is Not", 14th IEEE International Conference on Trust, Security and Privacy in Computing and Communications, Aug. 2015, Helsinki, Finland, 8 pages.
(Continued)

*Primary Examiner* — Mohammad A Siddiqi
(74) *Attorney, Agent, or Firm* — Muncy, Geissler, Olds & Lowe, P.C.

(57) ABSTRACT

The invention relates to a method and corresponding system for controlling, via secured transfers of tokens, operations of a plurality of interconnected devices having each a hardware trusted execution environment (TEE) and a controller, wherein each controller owns tokens attributed by a supervisor server and the TEE of each device is adapted to respond to a validation challenge via a zero-knowledge proof (ZKP) protocol, and generate and validate a single use ownership digital signature and its corresponding ownership signature validation challenge. The tokens can be transferred from one interconnected device to another in an online manner via a server or an offline manner via direct communication between the devices.

14 Claims, 9 Drawing Sheets

(58) Field of Classification Search
CPC ........... G05B 2219/36542; G05B 2219/25205; H04L 63/0807; H04L 63/101; Y02P 90/02
See application file for complete search history.

(56) References Cited

U.S. PATENT DOCUMENTS

| | | | |
|---|---|---|---|
| 2021/0357927 A1* | 11/2021 | Kita | G06Q 20/38215 |
| 2022/0046038 A1* | 2/2022 | Sinha | G06F 11/3072 |
| 2023/0162176 A1* | 5/2023 | Pettit | G06Q 20/3829 705/69 |

OTHER PUBLICATIONS

Wikipedia, Trusted Execution Environment, https://en.wikipedia.org/wiki/Trusted execution environment, retrieved Jun. 16, 2023, 10 pages.

S. Goldwasser, M. Bellare: "Lecture Notes on Cryptography", Jul. 2008: http://www.cs.tufts.edu/comp/165/papers/Goldwasser-Bellare-notes-cryptography.pdf, 289 pages.

Wikipedia, Digital Signature, https://en.wikipedia.org/wiki/Digital_signature, retrieved Jun. 16, 2023, 12 pages.

Wikipedia, Blind Signature, https://en.wikipedia.org/wiki/Blind_signature, retrieved Jun. 16, 2023, 4 pages.

Wikipedia, Signature with efficient protocols, https://en.wikipedia.org/wiki/Signatures_with_efficient_protocols, retrieved Jun. 16, 2023, 2 pages.

D. Chaum, Zero-Knowledge Undeniable Signatures, EUROCRYPT '90: Proceedings of the workshop on the theory and application of cryptographic techniques on Advances in cryptology, Feb. 1991, pp. 458-464.

Goldwasser S., Ostrovsky R. (1993) Invariant Signatures and Non-Interactive Zero-Knowledge Proofs are Equivalent. In: Brickell E.F. (eds) Advances in Cryptology—CRYPTO' 1992. CRYPTO, 1992. Lecture Notes in Computer Science, vol. 740. Springer, Berlin, Heidelberg. https://doi.org/10.1007/3-540-48071-4_16, 18 pages.

Camenisch J., Lysyanskaya A. (2003) A Signature Scheme with Efficient Protocols. In: Cimato S., Persiano G., Galdi C. (eds) Security in Communication Networks. SCN 2002. Lecture Notes in Computer Science, vol. 2576, 2003, pp. 268-289, Springer, Berlin, Heidelberg. https://doi.org/10.1007/3-540-36413-7_20.

Knox, D.A. and Adams, C. "Digital credentials with privacy-preserving delegation", Security and Communication Networks, First published: Jul. 15, 2011, https://doi.org/10.1002/sec.213, pp. 825-838.

Wikipedia, State Observer, https://en.wikipedia.org/wiki/State_observer, retrieved Jun. 16, 2023, 9 pages.

Kevin McGoff, Sayan Mukherjee, Natesh S. Pillai: "Statistical Inference for Dynamical Systems: A review"., Statistics Surveys, 2012. https:/arxiv.org/pdf/1204.6265.pdf, pp. 209-252.

Ekberg, Jan-Erik & Kostiainen, Kari & Asokan, N.. (2014): "The Untapped Potential of Trusted Execution Environments on Mobile Devices", Security & Privacy, 2014, IEEE. 12. pp. 29-37. 10.1109/MSP.2014.38.

Ekberg JE., Tamrakar S. (2012): "Mass Transit Ticketing with NFC Mobile Phones". In: Chen L., Yung M., Zhu L. (eds) "Trusted Systems". INTRUST, 2011. Lecture Notes in Computer Science, vol. 7222. Springer, Berlin, Heidelberg, pp. 48-65.

Tamrakar S., Ekberg JE. (2013): "Tapping and Tripping with NFC". In: Huth M., Asokan N., Čapkun S., Flechais I., Coles-Kemp L. (eds) "Trust and Trustworthy Computing". Trust 2013, 2013. Lecture Notes in Computer Science, vol. 7904. Springer, Berlin, Heidelberg, 18 pages.

"TEE System Architecture v1.2" | GPD_SPE_009, Published Dec. 2018. https://globalplatform.org/specs-library/tee-system-architecture-v1-2/, 50 pages.

Sawtooth v1.0.5 documentation: PoET 1.0 Specification, https://sawtooth.hyperledger.org/docs/core/releases/1.0/architecture/poet.html, 2018, 14 pages.

Medium: Understanding Hyperledger Sawtooth—Proof of Elapsed Time. Feb. 20, 2018 https://medium.com/kokster/understanding-hyperledger-sawtooth-proof-of-elapsed-time-e0c303577ec1, 12 pages.

G. Prisco. Intel Develops 'Sawtooth Lake' Distributed Ledger Technology for the Hyperledger Project. Bitcoin Magazine, Apr. 11, 2016. https://bitcoinmagazine.com/articles/intel-develops-sawtooth-lake-distributed-ledger-technology-for-the-hyperledger-project-1460397461, 8 pages.

International Search Report and Written Opinion issued with respect to application No. PCT/EP2021/025509.

* cited by examiner

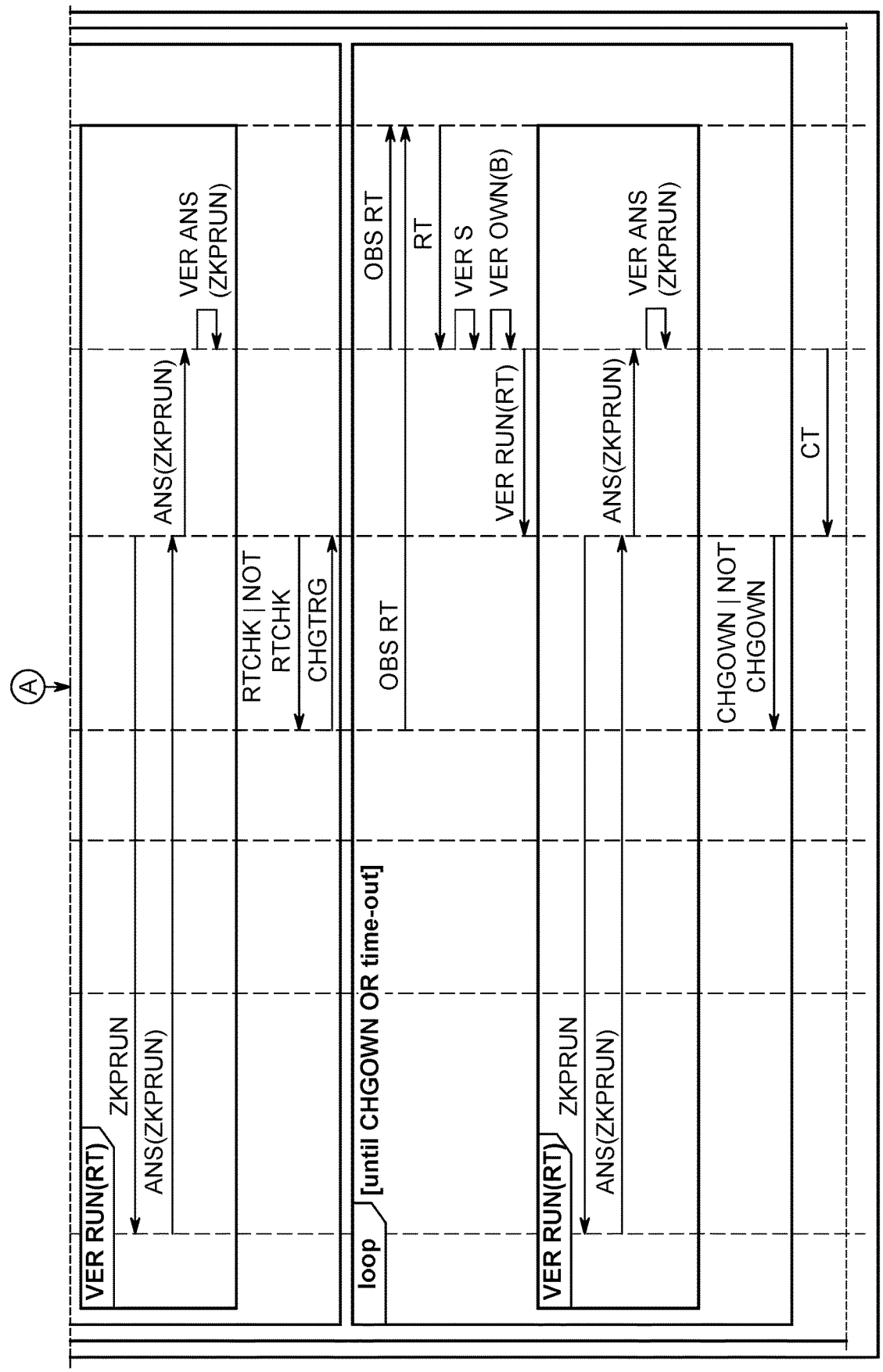
FIG. 5A CONTINUE

METHOD AND CORRESPONDING SYSTEM FOR CONTROLLING SECURE EXECUTION OF OPERATIONS BY INTERCONNECTED DEVICES

TECHNICAL FIELD

The present invention relates to the field of supervised control of operations performed by a plurality of devices equipped with communication units having secure hardware components operable to exchange data via secure wired or wireless data transfer and verification protocols.

BACKGROUND OF THE INVENTION

Interconnected devices via wired or wireless networks, e.g. industrial robots cooperating to perform various tasks within a factory according to industrial manufacturing processes, but also mobile devices like mobile phones, laptops or tablet computers, are widespread today. All those devices must exchange data between each other and with servers. These devices are generally equipped with a processing unit and a communication unit in order to exchange and process data received via a communication network. For example, interconnected robots are generally supervised by a server (having processing and communication means, as well as storage means like a database) in order to receive instructions for executing tasks.

In such a context of interconnected devices, many hardware and software solutions have been developed to provide secure transmission of data over networks. For example, US 2012117380 A1 discloses method of granting authorization to access a computer-based object in an automation system, computer program and automation system. Security of data exchanges through a network against intrusions (of untrusted party) has been improved by using encryption of data. For example, "Rich operating system Execution Environment" REE have been developed (e.g. like Android™) However, this is not always sufficient to prevent (physical) intrusions and data integrity. Thus, physical protection of the processing units, or at least part of them, has been developed to increase security. For example, the standard of "Trusted Execution Environment" TEE, using both hardware and software to protect data, has been developed by industry (for example the ARM TrustZone technology of ARM Holdings, see also ref.[1] and [2]). A trusted execution environment TEE is a secure area of a processor: as an isolated execution environment, it guarantees code and data loaded inside to be protected with respect to integrity and confidentiality of sensitive data.

TEE uses secure hardware enclaves. A secure enclave is a protected region of memory acting as a TEE for processing sensitive data inside a processing device. The secure enclave appears like an opaque box to the rest of the device and other processes running on the device: there is no way to view any data or code inside the enclave from the outside. For example, when parsing an application's query from a client driver, the processing device determines whether the query contains any operations on encrypted data that require the use of the secure enclave. For queries for which the secure enclave needs to be accessed: (i) the client driver sends the column encryption keys required for the operations to the secure enclave (over a secure channel), (ii) then, the client driver submits the query for execution along the encrypted query parameters. During query processing, the data or the column encryption keys are not exposed in plain text outside the secure enclave (the processing device delegates cryptographic operations and computations on encrypted columns to the secure enclave). The secure enclave (inside the processing device) can access sensitive data stored in the encrypted database column and the corresponding column encryption keys in plaintext. Before submitting a query that involves enclave computations to the processing device, the client driver inside the application must verify the secure enclave is a genuine enclave based on a given technology (for example, VBS "Virtualization-Based Security") and the code running inside the enclave has been signed for running inside the enclave.

Moreover, specific communication/verification protocols have been developed to improve security of data transfers (see [3]) over communication networks. For example, there exists verification protocols like "Zero-Knowledge Proof" ZKP (see [4]) to validate offline the digital signature (proof of signature) of a digital artefact (see, for example, [5], [6]).

There also exists ZKP protocols to sign a digital artefact with a new key oblivious of the key value, i.e. without learning how to positively respond to a proof of signature, e.g. via "Blind" (see [6], [7]), efficient (see [8], [9], [10]), or delegate (see [11]) signatures.

However, there is still a need for improving security and robustness in controlling execution of operations performed by interconnected devices with respect to potential intrusions altering execution data integrity, particularly in case the devices are not owned (or under full control) by a same entity (the entity having thus to manage some "untrusted" devices), so that only sensitive data that are strictly necessary for execution of the operations may be transferred, unauthorized (re)use of transmitted data is prevented, and traceability of data exchanges is also prevented.

SUMMARY OF THE INVENTION

According to one aspect, the invention relates to a method for controlling a plurality of devices via a server connected with a database, each device being equipped with a processing unit, a communication unit, and a hardware trusted execution environment (TEE) having a memory and securely connected to the communication unit via a dedicated secure hardware pathway, and being controlled by a corresponding controller, the communication units being adapted to securely communicate with each other via a wireless or wired point to point communication link for offline communication, and the server being adapted to securely communicate with each device communication unit via a wired or wireless communication network for online communication, the server and the communication units being adapted to transfer data using encrypted protocols, the server and the TEE of each device being adapted to respond to a validation challenge via a zero-knowledge proof (ZKP) protocol, and to generate and validate a single use ownership digital signature and its corresponding ownership signature validation challenge, wherein:
the database managed by the server stores digital tokens, each token delivered by the server comprising a token unique identifier, corresponding token data assigned by the server and including a server signature, and a token ownership challenge corresponding to a unique controller owning said token attributed by the server;
in case of offline transfer of a token owned by a controller A of a device to another controller B of another device, the controller A first sends an offline transfer request containing the token unique identifier and a TEE single use offline signature of the trusted execution environment of the device of controller A via online communication to the server by means of the communication unit of the device, upon reception of said offline transfer request the server checks that the token unique identifier is stored in the database with corresponding token ownership challenge and then, sends said token ownership challenge to the controller A, upon reception and verification of the token ownership challenge response from controller A the server verifies that the TEE single use offline signature is valid, in case said TEE single use offline signature is valid the server replaces the token ownership challenge corresponding to the token unique identifier with a TEE ownership challenge corresponding to the TEE single use offline signature and sends back a confirmation message indicating a successful replacement of token ownership challenge together with data necessary for the TEE of the device of controller A to start executing the token, in case said single use offline signature is not valid the server sends back a corresponding failure message corresponding to an invalid single use offline signature to controller A;

in case the controller A receives the confirmation message the TEE of the device of controller A starts executing the token and the communication unit of the device of controller A exposes the running token to the communication unit of the device of controller B which then continuously observes the running token, synchronizes with it in its trusted execution environment and checks that:

(i) the token is signed by the server,
(ii) the token owner is controller A, and
(iii) the token is running in the trusted execution environment of the device of controller A;
then the device of controller A changes the token ownership challenge of the running token in favor of controller B and the controller B continuously observes a copy of the token with the changed token ownership challenge in the trusted execution environment of its device, and
the TEE of the device of controller B stops running the token and generates a proof of stop, and the controller B then pushes online a transfer request containing the token unique identifier, the proof of stop and the changed token ownership challenge to the server, and upon reception of said transfer request the server checks that the request is valid and in case the request is valid it performs a corresponding change of token ownership challenge for this token in the database.

At step (ii) of the above method, the TEE of the device of controller B may check that the token owner is controller A via zero knowledge proof ZKP protocol at the device of controller B in offline communication with the communication unit of the device of controller A.

At step (iii) of the above method, the TEE of the device of controller B may check that the token is running in the trusted execution environment of the device of controller A via dynamical systems state synchronization/reconstruction and ZKP protocol for TEE signature at the device of controller B in offline communication with the communication unit of the device of controller A.

In the above method, the controller A may change the token ownership challenge of the running token in favor of controller B via oblivious computing at the device of controller A in offline communication with the communication unit of the device of controller B.

According to the above method, upon stopping to run the offline token by the TEE of the device of controller B:

the TEE of the device of controller B may generate a checkable one-time signature proving that the offline token has been stopped and containing a provable check of the original TEE single use offline signature, and the device of controller B may generate a one single use ownership challenge signature;

the controller B may add in the transfer request the checkable one-time signature, the provable check of the original TEE single use offline signature, and the single use ownership challenge signature, and pushes online the transfer request to the server; and upon reception of said transfer request, the server may check that the transfer request is valid by performing the following steps of:

checking that the token having the received token unique identifier is indeed offline, then, in case it is offline, verifying that the received one-time signature is valid and, then, in case it is valid, challenging ownership via the received original TEE single use offline signature, then checking that the received single use ownership challenge signature is valid, and, in case it is valid, replacing in the database the stored token ownership challenge for this token unique identifier with the received changed token ownership challenge.

In case the TEE of the device of controller A fails in running the token, or stops running the token before its transfer to the device of controller B, the TEE of the device of controller A may generate a checkable one-time signature proving that the offline token has been stopped, and the device of controller A may generate a single use ownership challenge signature corresponding to a new token ownership challenge for controller A;

the controller A may send to the server a put back request indicating to the server to put back online the token, together with the checkable one-time signature and the single use ownership challenge signature;

upon reception of said put back request the server may check that the request is valid by performing the following steps of:

verifying that the token is indeed offline, then challenging the original single use offline signature and then verifying that the received one-time signature is valid and, in case it is valid and upon verifying that the received single use ownership challenge signature is indeed valid, replacing in the database the stored token ownership challenge for this token unique identifier with the new token ownership challenge.

According to the above method, in case of online transfer of a token owned by a controller A of a device to another controller B of another device, the transfer may involve:

sending by the controller A to the controller B the token unique identifier of the token to be transferred, via the communication unit of the device, sending back by controller B of a single use ownership challenge signature of controller B via the communication unit of the another device, sending by the controller A a transfer request to the server specifying the token unique identifier and the received single use ownership challenge signature of controller B, upon reception of said transfer request the server checks that the token unique identifier is stored in the database with corresponding token ownership challenge and then, send said token ownership challenge to the controller A, upon reception and verification of the ownership response from controller A the server verifies that the single use ownership signature of controller B in the transfer request is valid, and in case said single use ownership signature is valid the server replaces the token ownership challenge corresponding to the token unique identifier with a token ownership challenge corresponding to controller B and sends back a confirmation of transfer to the controller A, and in case said single use ownership signature is not valid the server sends back a failure of transfer message to controller A.

According to another aspect, the invention relates to a system for controlling a plurality of devices via server connected with a database, each device being equipped with a processing unit, a communication unit, and a hardware trusted execution environment (TEE) having a memory and securely connected to the communication unit via a dedicated secure hardware pathway, and being controlled by a corresponding controller, the communication units being adapted to securely communicate with each other via a wireless or wired point to point communication link for offline communication, and the server being adapted to securely communicate with each device communication unit via a wired or wireless communication network for online communication, the server and the communication units being adapted to transfer data using encrypted protocols, the server and the TEE of each device being adapted to respond to a validation challenge via a zero-knowledge proof (ZKP) protocol, and to generate and validate a single use ownership digital signature and its corresponding ownership signature validation challenge, wherein:

the server is adapted to deliver digital tokens and store the delivered tokens in the database, each token delivered by the server comprising a token unique identifier, corresponding token data assigned by the server and including a server signature, and a token ownership challenge corresponding to a unique controller owning said token attributed by the server;

in order to perform an offline transfer of a token owned by a controller A of a device to another controller B of another device, the controller A first sends an offline transfer request containing the token unique identifier and a TEE single use offline signature of the trusted execution environment of the device of controller A via online communication to the server by means of the communication unit of the device;

upon reception of said offline transfer request the server checks that the token unique identifier is stored in the database with corresponding token ownership challenge and then, sends said token ownership challenge to the controller A;

upon reception and verification of the token ownership challenge response from controller A the server verifies that the TEE single use offline signature is valid, in case said TEE single use offline signature is valid the server replaces the token ownership challenge corresponding to the token unique identifier with a TEE ownership challenge corresponding to the TEE single use offline signature and sends back a confirmation message indicating a successful replacement of token ownership challenge together with data necessary for the TEE of the device of controller A to start executing the token, in case said single use offline signature is not valid the server sends back a corresponding failure message corresponding to an invalid single use offline signature to controller A;

in case the controller A receives the confirmation message the TEE of the device of controller A starts executing the token and the communication unit of the device of controller A exposes the running token to the communication unit of the device of controller B which then continuously observes the running token, synchronizes with it in its trusted execution environment and checks that:

(i) the token is signed by the server,
(ii) the token owner is controller A, and
(iii) the token is running in the trusted execution environment of the device of controller A;

then the device of controller A changes the token ownership challenge of the running token in favor of controller B and the controller B continuously observes a copy of the token with the changed token ownership challenge in the trusted execution environment of its device, and the TEE of the device of controller B stops running the token and generates a proof of stop, and the controller B then pushes online a transfer request containing the token unique identifier, the proof of stop and the changed token ownership challenge to the server, and upon reception of said transfer request the server checks that the request is valid and in case the request is valid it performs a corresponding change of token ownership challenge for this token in the database.

In the above system, in order to perform the operation of checking (ii) that the token owner is controller A, the TEE of the device of controller B may check that the token owner is controller A via zero knowledge proof protocol at the device of controller B in offline communication with the communication unit of the device of controller A.

In order to perform the operation of checking (iii) that the token is running in the trusted execution environment of the device of controller A, the TEE of the device of controller B may check that the token is running in the trusted execution environment of the device of controller A via dynamical systems state synchronization/reconstruction and ZKP protocol for TEE signature at the device of controller B in offline communication with the communication unit of the device of controller A.

According to the above system, the controller A may change the token ownership challenge of the running token in favor of controller B via oblivious computing at the device of controller A in offline communication with the communication unit of the device of controller B.

According to the system, upon stopping to run the offline token by the TEE of the device of controller B, the TEE of the device of controller B may generate a checkable one-time signature proving that the offline token has been stopped and containing a provable check of the original TEE single use offline signature, and the device of controller B may generate a single use ownership challenge signature;

the controller B may add in the transfer request the checkable one-time signature, the provable check of the original TEE single use offline signature, and the single use ownership challenge signature, and may push online the transfer request to the server via the communication unit of the device of controller B; and upon reception of said transfer request, the server may check that the transfer request is valid by performing the following operations of:
  checking that the token having the received token unique identifier is indeed offline, then, in case it is offline, verifying that the received one-time signature is valid and, then, in case it is valid, challenging ownership via the received original TEE single use offline signature, then
  checking that the received single use ownership challenge signature is valid, and, in case it is valid, replacing in the database the stored token ownership challenge for this token unique identifier with the received changed token ownership challenge.

In the above system, in case the TEE of the device of controller A fails in running the token, or stops running the token before its transfer to the device of controller B:
  the TEE of the device of controller A may generate a checkable one-time signature proving that the offline token has been stopped, and the device of controller A generates a single use ownership challenge signature corresponding to a new token ownership challenge for controller A;
  the controller A may send to the server a put back request indicating to the server to put back online the token, together with the checkable one-time signature and the single use ownership challenge signature, via online communication by means of the communication unit of the device of controller A;
  upon reception of said put back request the server may check that the request is valid by performing the following operations of:
    verifying that the token is indeed offline, then
    challenging the original single use offline signature and then verifying that the received one-time signature is valid and, in case it is valid and upon verifying that the received single use ownership challenge signature is indeed valid, replacing in the database the stored token ownership challenge for this token unique identifier with the new token ownership challenge.

According to the above system, in case of online transfer of a token owned by a controller A of a device to another controller B of another device, the transfer may be carried out by performing the following operations:
  sending by the controller A to the controller B the token unique identifier of the token to be transferred, via offline communication between the communication units of the device of controller A and the device of controller B,
  sending back by controller B of a single use ownership challenge signature of controller B via offline communication between the communication units of the device of controller B and the device of controller A,
  sending by the controller A a transfer request to the server specifying the token unique identifier and the received single use ownership challenge signature of controller B, via online communication by means of the communication unit of the device of controller A,
  upon reception of said transfer request the server checks that the token unique identifier is stored in the database with corresponding token ownership challenge and then, sends said token ownership challenge to the controller A, via online communication with the communication unit of the device of controller A,
  upon reception, via online communication with the communication unit of the device of controller A, and verification of the ownership response from controller A, the server verifies that the single use ownership signature of controller B in the transfer request is valid, and
  in case said single use ownership signature is valid the server replaces the token ownership challenge corresponding to the token unique identifier with a token ownership challenge corresponding to controller B and sends back a confirmation of transfer to the controller A via online communication with the communication unit of the device of controller A,
  in case said single use ownership signature is not valid the server sends back a failure of transfer message to controller A via online communication with the communication unit of the device of controller A.

The present invention will be described more fully hereinafter with reference to the accompanying drawings in which like numerals represent like elements throughout the different figures, and in which prominent aspects and features of the invention, in no way limiting, are illustrated.

DETAILED DESCRIPTION

Figure 1:
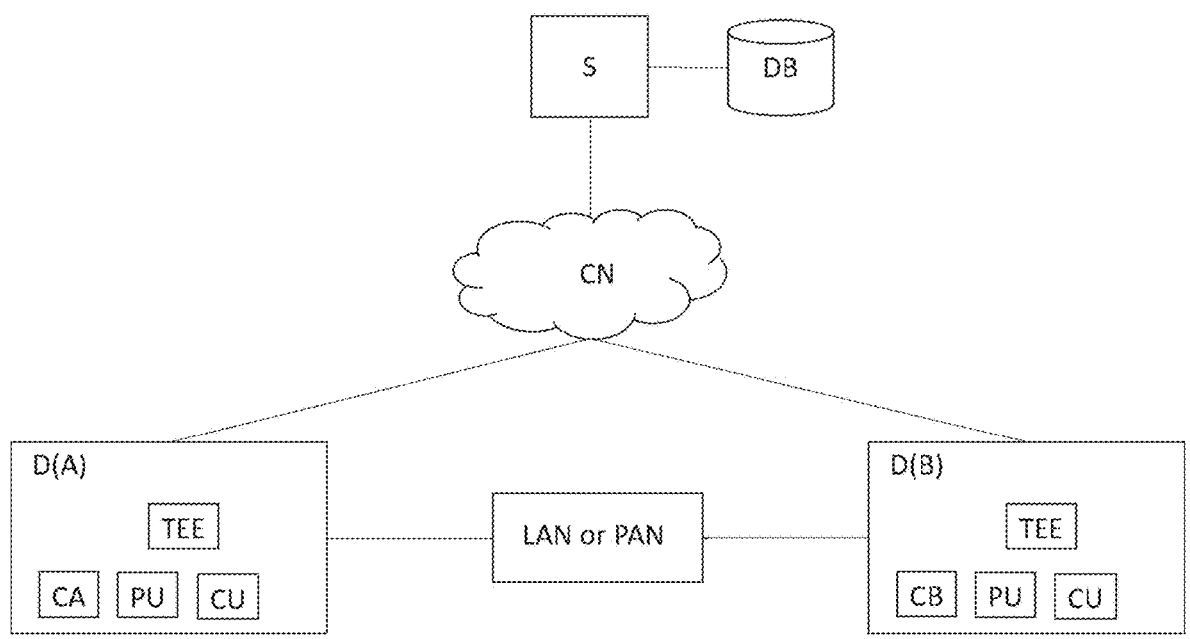
FIG. 1 schematically illustrates a system comprising a server (S) for supervising operations of two interconnected devices D(A) and D(B).

According to an embodiment of the invention schematically shown on FIG. 1, a server S supervises operations performed by a plurality of devices (here, only two devices are shown: D(A) and D(B)), e.g. industrial robots in a factory or automated machines on a distribution line. The devices have each a processing unit PU and a communication unit CU. Each device is controlled by a corresponding controller (here, controller A, "CA", and controller B, "CB"). The server S has computing capabilities and a communication module to allow direct transmission of data with the devices, i.e. in online data transfers through a wired or wireless communication network CN (e.g. internet), using an encrypted communication protocol, and using a verification protocol involving single use ownership digital signatures and corresponding ZKP ("Zero-Knowledge Proof") challenge-based ownership validation protocol. According to the invention, secure data transfers comprise exchange of tokens. The server S can create a digital token T comprising a corresponding token unique identifier Tid (e.g. a serial number, possibly alphanumeric), specific token data assigned by the server S and including a server digital signature SDS, and a token ownership challenge Toc corresponding to a controller to which this token has been attributed by the server S. Optionally, the server signature SDS may be added to the token unique identifier instead of the token assigned data. These assigned token data may be, for example, programmed instructions to be executed by a device of a controller or an application(s) to be run on a processing unit of said device. The server S manages a database DB in which the tokens are stored. The first two "entries" of a token, i.e. the token unique identifier Tid and the token assigned data (with the server signature SDS), are immutable, while the third entry (i.e. the token ownership challenge Toc) may be changed (according to possible transfer of the token from a controller to another controller). The third entry of the token is an encrypted ownership key or any function, data, or piece of code allowing an oblivious challenge of ownership to be completed without revealing the owner. The server S stores the tokens in a database DB and updates the DB content according to various transfers of tokens between the devices through a communication link. According to the invention, each controller can directly communicate with the server S, via online data transfer and ZKP protocol, to know the tokens it owns, their corresponding token unique identifiers and assigned token data.

Operations to be performed by the device, particularly in case of cooperation of the devices for realizing complex tasks, involve transfer of tokens between the devices, without involving the server S, i.e. offline data transfers between these devices. Offline communications between devices (i.e. between their respective communication units), via a wireless communication link CL (e.g. a "Local Area Network" LAN like Wi-Fi, or "Personal Area Network" PAN like Bluetooth, "Infrared Data Association" IrDA, wireless USB, or "Near Field Communication" NFC) or via a wired communication link CL (e.g. a LAN like Ethernet), also use a communication protocol with single use ownership digital signature and ownership signature validation challenge, i.e. "ownership challenge" for short, with verifications based on ZKP protocol. The processing unit PU and communication unit CU of each device are securely connected to corresponding Trusted Execution Environment hardware TEE. Each TEE of a device having a memory and being securely connected to the communication unit CU of the device via a dedicated secure hardware pathway. The communication units CU of the devices are capable to communicate with each other via Zero-Knowledge Proof ZKP protocol to validate (offline) the signature (proof of signature) of a digital artefact, through the communication link CL in offline mode (i.e. without involving the server S) in order to exchange tokens and access to their unique token identifiers and assigned data. Once an offline exchange of tokens between two controllers of two devices has been performed according to a given offline exchange protocol (see below), the server S is informed of the transfers at a later stage, when the controller having received one or several tokens contacts the server in online mode (via the communication unit of its device through the communication network CN) and transmits a list of the tokens received offline. Moreover, the server S can obliviously compile a list of token unique identifiers that have been transferred offline. Conversely, each controller of a device can obliviously (i.e. without revealing its own identity) query the server S (via online communication between the communication unit of the device and the server) to know a list of tokens (with their assigned data) owned by said controller according to the (updated) content in the database DB.

Figure 2:
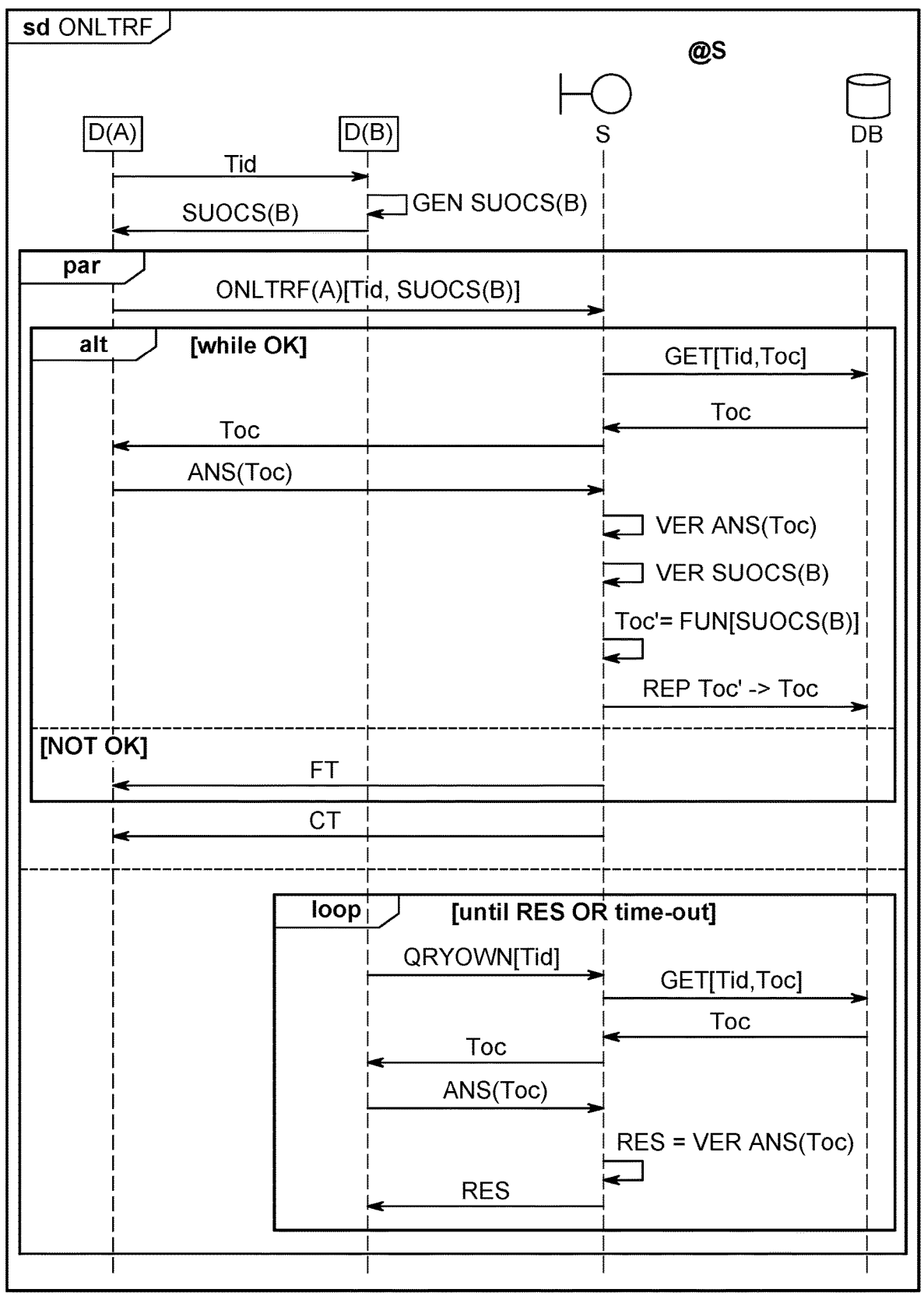
FIG. 2 schematically illustrates an embodiment of online transfer of a token owned by a controller A of a device D(A) to another controller B of another device D(B).

According to the invention, a transfer of a token between two controllers can be realized in online mode or in offline mode. FIG. 2 is a diagram illustrating an embodiment of a case of online transfer ONLTRF of a token T owned by a controller CA of a device D(A) to another controller CB of another device D(B). Such a transfer involves the following operations:

the controller CA sends to the controller CB the token unique identifier Tid of the token T (owned by controller CA) that controller CA wants to transfer to the controller CB, i.e. the token unique identifier Tid is sent by controller CA via the communication unit CU of the device D(A) to the communication unit CU of the device D(B) through the communication link CL;

upon reception of the transferred Tid by (the communication unit of) controller CB, the controller CB generates a single use ownership challenge signature GEN SUOCS(B) of controller CB and then sends back to (the communication unit of the device D(A) of) controller CA the generated single use ownership challenge signature SUOCS(B) of controller CB, via the communication unit CU of the device D(B) through CL;

upon reception of the single use ownership challenge signature SOUCS(B) of controller CB, the controller CA sends an online transfer request ONLTRF(A) to the server S containing the token unique identifier Tid and the received single use ownership challenge signature SUOCS(B) of controller CB, i.e. the transfer request ONLTFR(A) is sent by the communication unit CU of D(A) to the server S via the communication network CN (see sub-diagram "par" of FIG. 2);

upon reception of said transfer request ONLTRF(A), the server S checks (see sub-diagram "alt [while OK]" of FIG. 2) whether the token unique identifier Tid in the transfer request is indeed stored in the database DB with a corresponding token ownership challenge Toc (normally, an ownership challenge corresponding to controller CA), i.e. the server S obtains the corresponding Tid and Toc (see operation GET[Tid, Toc] on FIG. 2) and then, in case the token is stored in DB, the server S sends said token ownership challenge Toc to the controller CA, i.e. the server S send the Toc to the communication unit CU of the device D(A) of controller CA via the communication network CN;

upon reception of the Toc, the controller CA sends back to the server S an ownership response ANS(Toc) to the received ownership challenge Toc, i.e. the communication unit CU of D(A) sends the ownership response calculated by the processing unit PU of D(A) via the communication network CN;

upon reception of the ownership response from controller CA ANS(Toc) and verification of said response VER ANS(Toc) by the server S, the server S verifies (see operation VER SUOCS(B)) that the single use ownership signature SUOCS(B) of controller CB in the transfer request ONTR(A) is valid. In case said single use ownership signature SUOCS(B) is valid the server S provides a token ownership challenge Toc' corresponding to the received single use ownership signature SUOCS(B) of controller CB (see the operation Toc'=FUN[SUOCS(B)], indicating that Toc' is a function of SUOCS(B)) and replaces the token ownership challenge Toc corresponding to the token unique identifier Tid with the token ownership challenge Toc' in the database DB (see operation REP Toc'→Toc) and sends back a "confirmation of transfer" message CT to the (communication unit CU of the device D(A) of) controller CA. In case said single use ownership signature SUOCS(B) is not valid the server S sends back a "failure of transfer" message FT to controller CA, via the communication network CN (see sub-diagram "alt [NOT OK]" of FIG. 2). The controller CB can check whether the ownership change (i.e. the transfer of the token from controller CA to controller B) has been performed via online communication between the communication unit CU of its device D(B) and the server S by sending an ownership query (see the operation QRYOWN[Tid] of the sub-diagram "loop [until RES OR time-out" of FIG. 2) containing the received token unique identifier Tid of the token T to the server S (via the communication unit CU of the device D(B)). Upon reception of said ownership query, the server S obtains from the database DB the (updated) token ownership challenge corresponding to the received Tid (see the operation GET[Tid, Toc]) and sends back to the communication unit CU of the device B(B) of controller CB the obtained token ownership challenge Toc. Upon reception of this token ownership challenge Toc, the controller CB sends back to the server S an ownership response ANS(Toc) to the received ownership challenge Toc, i.e. the communication unit CU of D(B) sends the ownership response ANS(Toc) calculated by the processing unit PU of D(B) via the communication network CN. Upon reception of the ownership response ANS(Toc), the server S verifies the received response (see operation RES=VER ANS(Toc)) and, the server S sends back to the communication unit CU of the device D(B) of controller CB said result RES. In case said result RES is positive, it indicates to the controller CB that the transfer of the token has been performed (i.e. the controller CB is now the owner of the token T, registered in the database DB). In fact, device D(B) starts checking immediately and polls until having a positive result or time is over.

Figure 3:
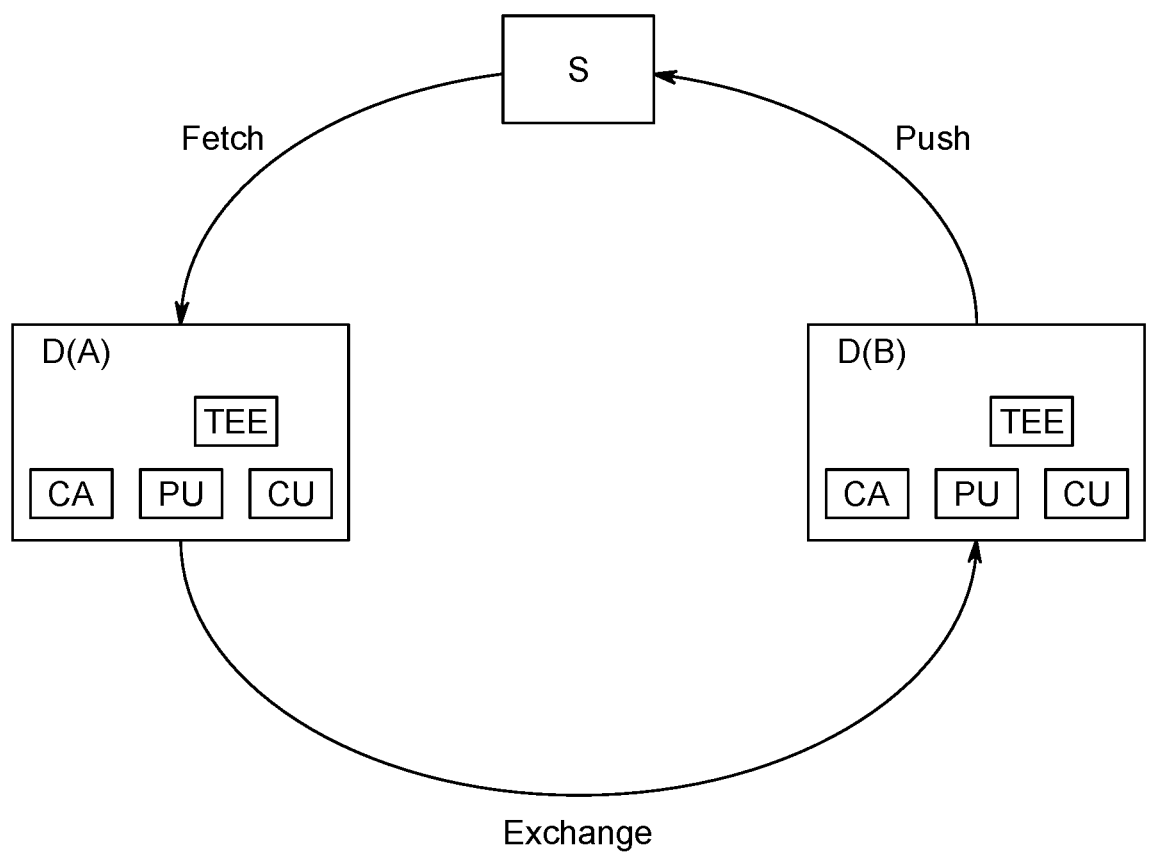
FIG. 3 schematically illustrates the main operations "Fetch", "Exchange" and "Push" involved between the server S and the devices D(A) and D(B) of controllers CA and CB to realize an offline transfer of a token between D(A) and D(B) according to the invention.

FIG. 3 schematically illustrates the main operations "Fetch", "Exchange" and "Push" that are involved between the server S and the devices D(A) and D(B) of controllers CA and CB to realize an offline transfer of a token between the devices D(A) and D(B) according to the invention.

Figure 4:
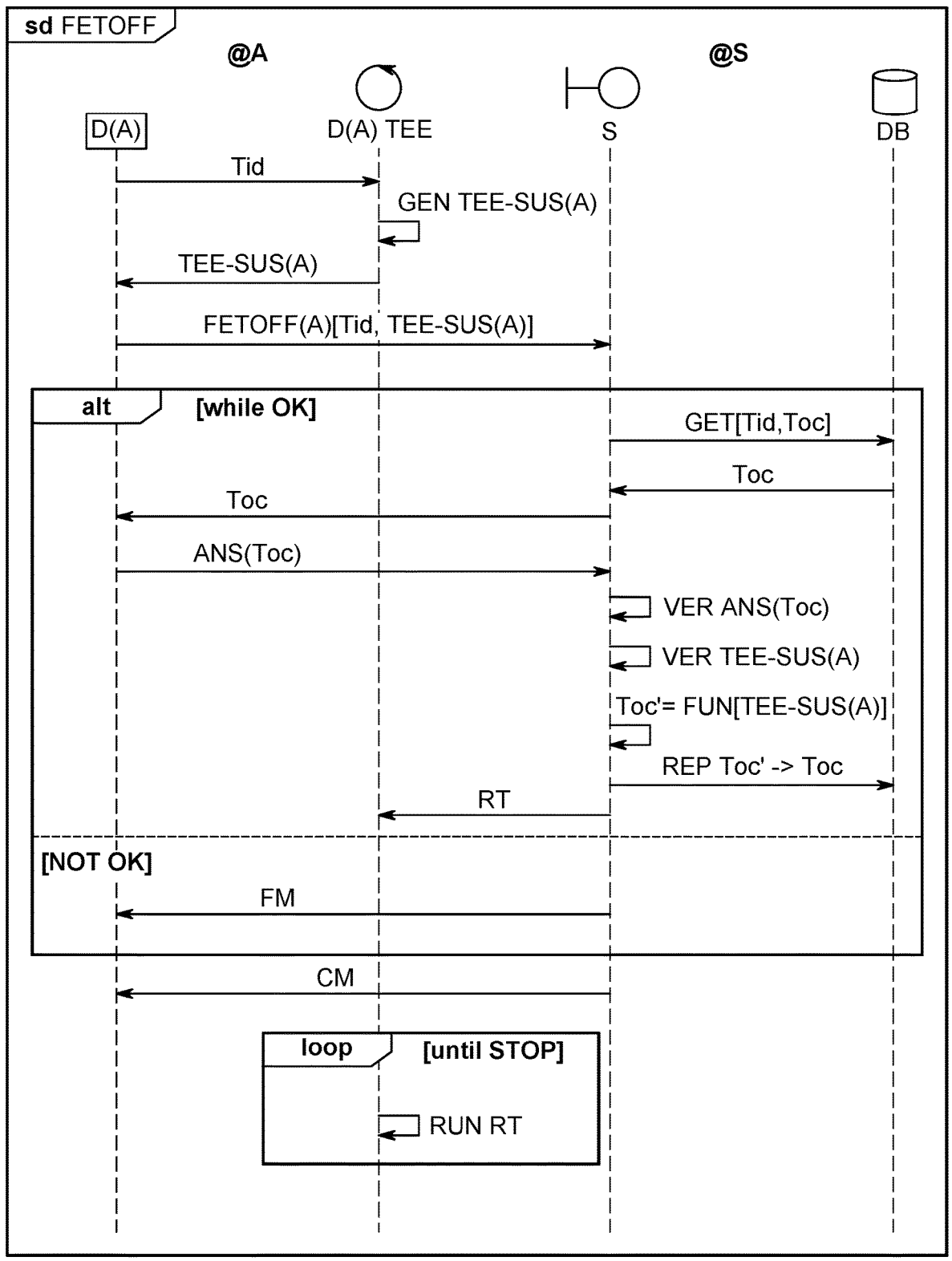
FIG. 4 schematically illustrates an embodiment of an operation of fetching of a token by a controller CA of device D(A) from the server S to prepare an offline transfer according to the invention of a token T owned by the controller CA to a controller CB of a device D(B).

FIG. 4 is a diagram illustrating an embodiment of an operation of offline fetching (see also the operation "Fetch" on FIG. 3) of a token T by a controller CA of device D(A) from the server S to prepare an offline transfer according to the invention of the token T owned by the controller CA to a controller CB of a device D(B). Such a fetching involves the following operations:

before going offline, the controller CA of device D(A) first performs an offline transfer request FETOFF(A) containing the token unique identifier Tid and a TEE single use (offline) signature TEE-SUS(A) of the trusted execution environment D(A) TEE of the device D(A). In practice, the communication unit CU of device D(A) sends the token unique identifier Tid of token T to its D(A) TEE, the D(A) TEE then generates a trusted execution environment single use signature GEN TEE-SUS(A) and sends back to the communication unit CU of device D(A) the generated TEE-SUS(A). The device D(A) then sends to the server S (via online communication through the communication network CN) the offline transfer request FETOFF(A) [Tid, TEE-SUS(A)] containing the token unique identifier Tid and the TEE single use signature TEE-SUS(A);

upon reception of said offline transfer request FETOFF (A)[Tid, TEE-SUS(A)] (see the sub-diagram "alt [while OK] on FIG. 4) the server S checks GET(Tid, Toc) that the token unique identifier Tid is indeed in the database DB with corresponding token ownership challenge Toc and then, sends said token ownership challenge Toc to the controller CA (i.e. S sends the Toc to the communication unit CU of the device D(A) of controller CA via the communication network CN);

the communication unit CU of the device D(A) of the controller CA receives from S the token ownership challenge Toc, the processing unit PU of the device D(A) calculates a corresponding ownership challenge response ANS(Toc) to the received Toc, and the communication unit CU of the device D(A) sends back to the server S this ownership challenge response ANS (Toc);

upon reception of ANS(Toc) and verification VER ANS (Toc) of the ownership challenge response from controller CA, the server S verifies VER TEE-SUS(A) that the TEE single use offline signature TEE-SUS(A) received with the corresponding offline transfer request FETOFF(A)[Tid, TEE-SUS(A)] is valid. In case said TEE single use offline signature TEE-SUS(A) is valid, the server S generates Toc'=FUN[TEE-SUS(A)] a token ownership challenge Toc' corresponding to the valid TEE single use offline signature TEE-SUS(A) and replaces the token ownership challenge Toc corresponding to the token unique identifier Tid with the token ownership challenge Toc' corresponding to the TEE single use offline signature TEE-SUS(A) in the database DB (see operation REP Toc'→Toc). Then, the server S sends back to the D(A) TEE of device D(A) a "Running Token" RT, and the TEE of the device D(A) of controller CA then starts executing the token RT (see the sub-diagram "loop [until STOP] RUN RT), and the server S further sends back to the communication unit CU of device D(A) a confirmation message CM indicating that the token RT is running in the D(A) TEE and can be transferred.

Figure 5A:
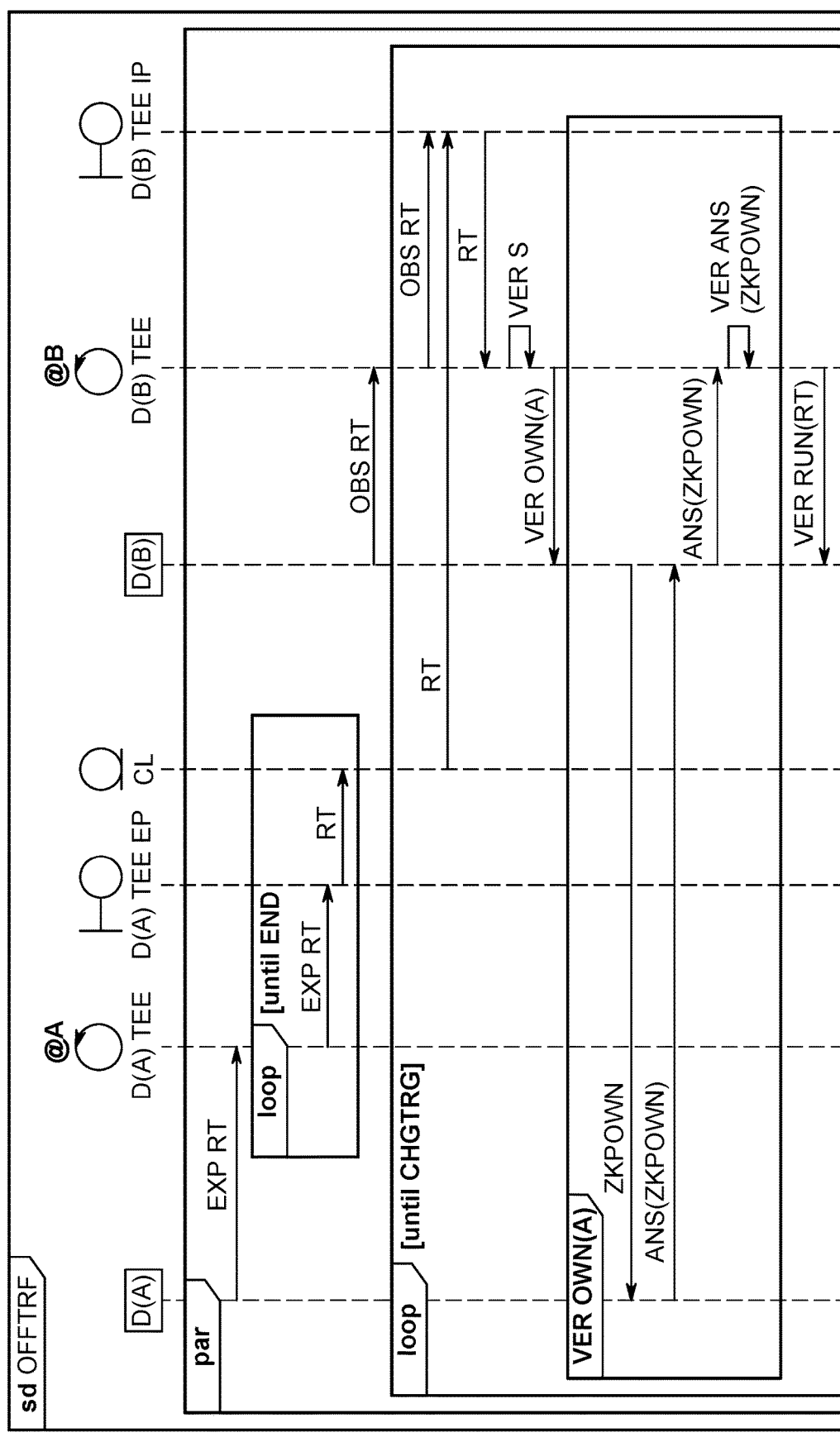
FIG. 5A schematically illustrates an embodiment of an operation of offline transfer OFFTRF according to the invention of a running token RT owned by a controller CA of a device D(A) to a controller CB of a device D(B).

In case said single use offline signature TEE-SUS(A) is not valid the server S sends back a corresponding failure message FM corresponding to an invalid single use offline signature TEE-SUS(A) to the communication unit of the device D(A) controller CA, via the communication network CN.

in case the controller CA receives the confirmation message CM relating to the runnable token RT and the D(A) TEE has started executing (running) said token RT (see FIG. 5A), the communication unit CU of the device D(A) of controller CA exposes EXP RT the running token RT to the communication unit CU of the device D(B) of controller CB which then continuously observes OBS RT the running token RT, synchronizes with it in its trusted execution environment D(B) TEE. In a preferred mode, the trusted execution environment D(A) TEE of device D(A) exposes the running token RT via an "Externalization Peripheral" (EP), D(A) TEE EP, to transfer the running token RT through the (offline) communication link CL (see the sub-diagram "loop [until END]" of FIG. 5A). The externalization peripheral may be, for example, the output channel of a PAN/LAN communication peripheral like Wi-Fi, Bluetooth, IrDA, wireless USB, or NFC, to be paired, on the side of device D(B), with their corresponding input channel as "internalization peripheral", as well as a display/screen, to be paired with a camera as internalization device to form a screen-camera communication set-up. As mentioned above, the device D(B) can then continuously observe (see the sub-diagrams "loop [until CHGTRG]]" and "loop [until CHGOWN OR time-out]" of FIG. 5A) the exposed running token RT in its trusted execution environment D(B) TEE. Preferably, the operations of observation of the RT (via the communication link CL) and synchronization with the running token RT is performed via an "Internalization Peripheral" (IP), D(B) TEE IP, of the device D(B). The trusted execution environment D(B) TEE then obtains the running token RT from the D(B) TEE IP and checks "VER S" whether (i) the running token RT is signed by the server S, and checks "VER OWN(A)" whether (ii) the owner of the running token RT is indeed the controller CA (see the sub-diagram "loop [until CHGTRG] of FIG. 5A). Preferably, the later operation is performed via a Zero Knowledge Proof ZKP verification protocol (see the sub-diagram VER OWN(A) of FIG. 5A): the communication unit CU of D(B) sends (offline via the communication link CL) a ZKP owner challenge ZKPOWN to the communication unit of device D(A), the communication unit CU of device D(A) sends back a corresponding ownership challenge response ANS(ZKPOWN) to the communication unit CU of device D(B) and the trusted execution environment D(B) TEE of device D(B) then verifies VER ANS(ZKPOWN) the received response. Moreover, the trusted execution environment D(B) TEE of device D(B) verifies (iii) that the observed token RT is indeed running in the trusted execution environment of the device of controller CA, VER RUN(RT). This later operation is performed via a Zero Knowledge Proof ZKP verification protocol (see the sub-diagram VER RUN(RT) of FIG. 5A): the communication unit CU of D(B) sends (offline via the communication link CL) a ZKP running challenge ZKPRUN to the communication unit CU of device D(A), the communication unit CU of device D(A) sends back a corresponding running challenge response ANS(ZKPRUN) to the communication unit CU of device D(B) and the trusted execution environment D(B) TEE of device D(B) then verifies VER ANS(ZKPRUN) the received response.

then, in case the above conditions (i) to (iii) are fulfilled, the device D(B) sends a RTCHK message via the communication link CL to let know to the device D(A) that the running token is indeed signed by S, owned by controller CA, and running. In case these conditions are not all fulfilled, the device D(B) sends a corresponding NOT RTCHK message via the communication link CL.

Figure 5B:
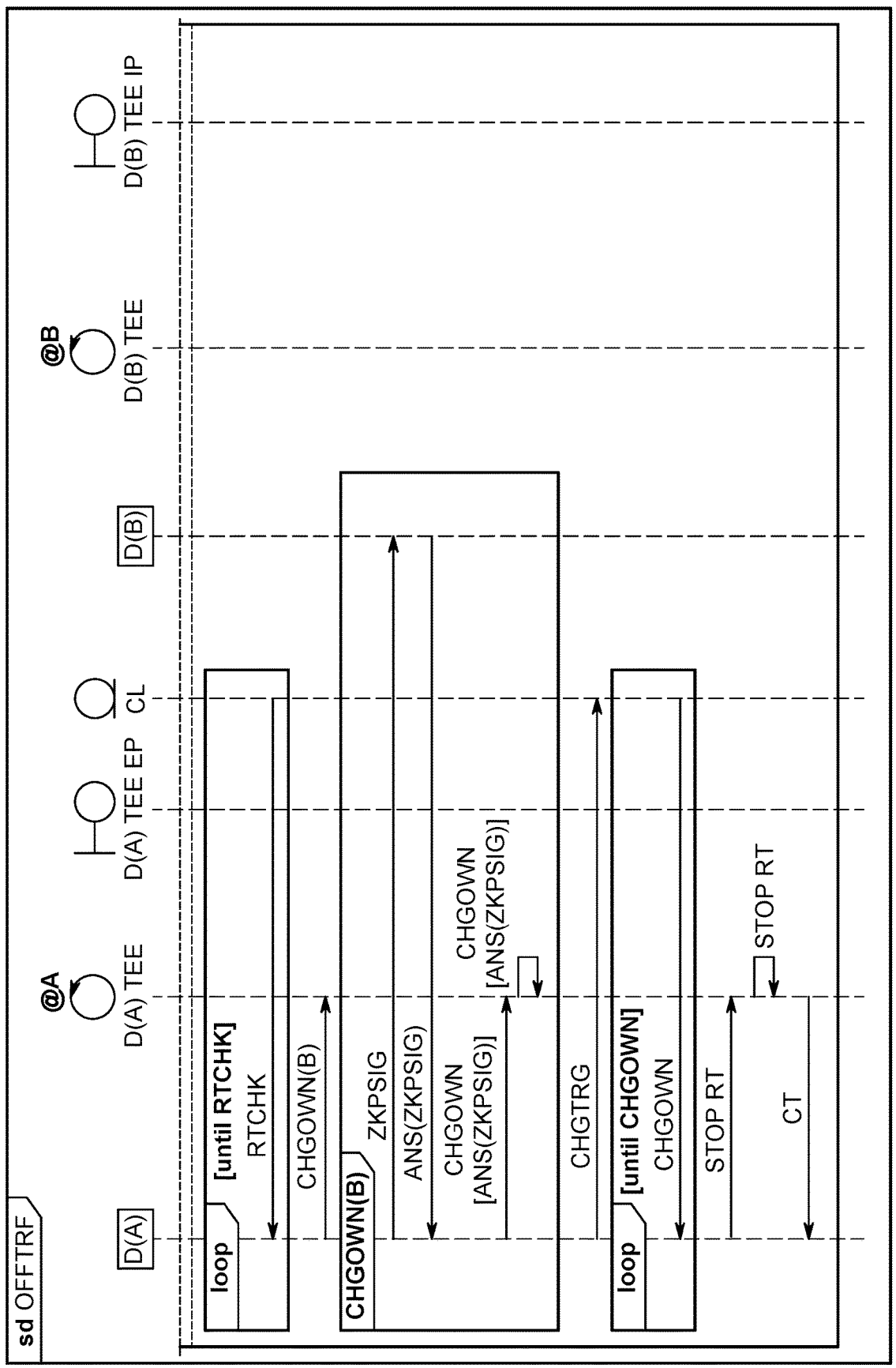
FIG. 5B is a continuation of FIG. 5A.

Meanwhile, upon reception of the message RTCHK by the device D(A) (see the sub-diagram "loop [until RTCHK]" of FIG. 5B), the controller CA starts changing ownership of the running token RT in favor of controller CB by sending a message CHGOWN(B) to the D(A) TEE via the communication unit CU of device D(A). This operation is preferably performed via a Zero Knowledge Proof ZKP signature verification protocol (see the sub-diagram "CHGOWN(B)" of FIG. 5B): D(A) sends a ZKP signature ZKPSIG challenge to D(B), then D(B) sends back to D(A) a response to the challenge ANS(ZKPSIG), upon verification of the received response the device D(A) changes the ownership of the token running in its TEE in favor of controller CB based on the received response CHGOWN[ANS(ZKPSIG)] and a corresponding message CHGTRG is sent by D(A) via the communication link CL to let know controller CB that ownership of the running token RT has been changed (in favor of CB). It is now the interest of D(A) to stop running the token STOP RT in its D(A) TEE (e.g. to reduce energy consumption by D(A)), see the sub-diagram "loop [until CHGOWN]" of FIG. 5B. When the running token RT has been stopped in the D(A) TEE of device D(A), the D(A) TEE sends a message CT of confirmation of transfer to the device D(A).

Meanwhile, upon reception of the message CHGTRG by the device D(B), via the communication link CL (see the sub-diagram "loop [until CHGOWN OR time-out" of FIG. 5A) the trusted execution environment D(B) TEE of device D(B) obtains the running token RT from the observed running token OBS RT, verifies VER S that the token is signed by the server S and checks VER OWN(B) whether the (new) owner of the running token RT is controller CB and whether VER RUN(RT) the token is indeed running. This later operation is preferably performed via a Zero Knowledge Proof ZKP verification protocol (see the sub-diagram "VER RUN (RT)" of FIG. 5A): D(B) sends a ZKP challenge ZKPRUN to D(A), then D(A) sends back to D(B) a response to the challenge ANS(ZKRUN), upon verification of the received response the device D(B) sends a message CHGOWN via the communication link to let know controller CA that the owner of the running token is now controller CB. In case the verification that the token is running has a negative result, the device D(B) sends a message NOT CHGOWN via the communication link to let know controller A that the change of owner has not been performed.

after the change of ownership, the TEE of the device of controller B also has advantage to stop running the token T (see FIG. 6A) and generate a proof of stop, and the controller B then pushes online a transfer request PUSONL(B) containing the token unique identifier Tid, the proof of stop COTS(B) and a generated single use ownership challenge signature SUOCS(B) to the server S;

upon reception of said transfer request PUSONL(B) the server S checks that the request is valid, and in case the request is valid it performs a corresponding change of token ownership challenge for this token T (i.e. the token having the token unique identifier Tid) in the database DB.

Figure 6A:
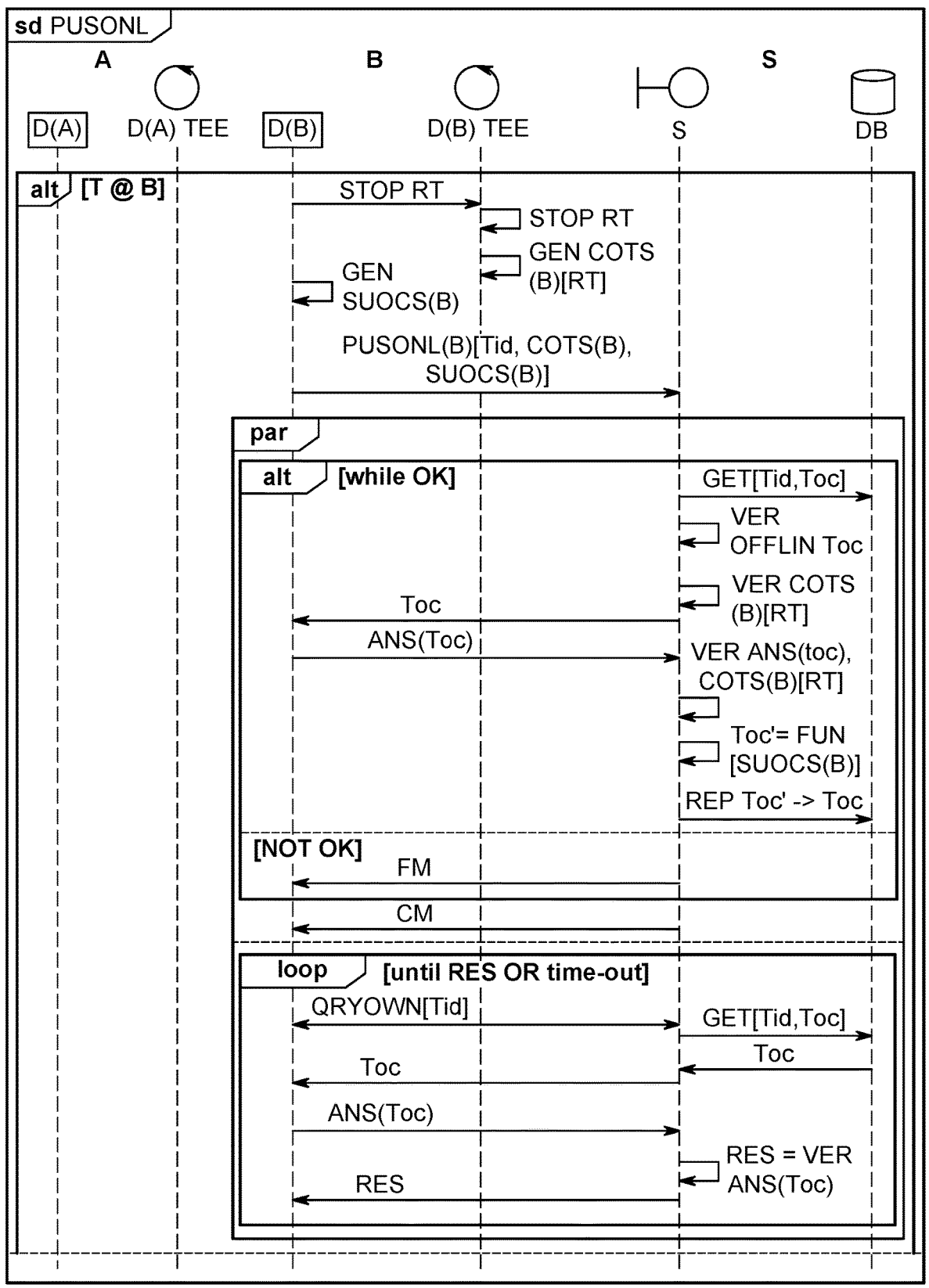
FIG. 6A schematically illustrate an embodiment of an operation of stopping a running token RT and pushing online a corresponding transfer request PUSONL by a device D(B) of a controller CB having received a token from a controller CA of a device D(A) according to the invention.
Figure 6B:
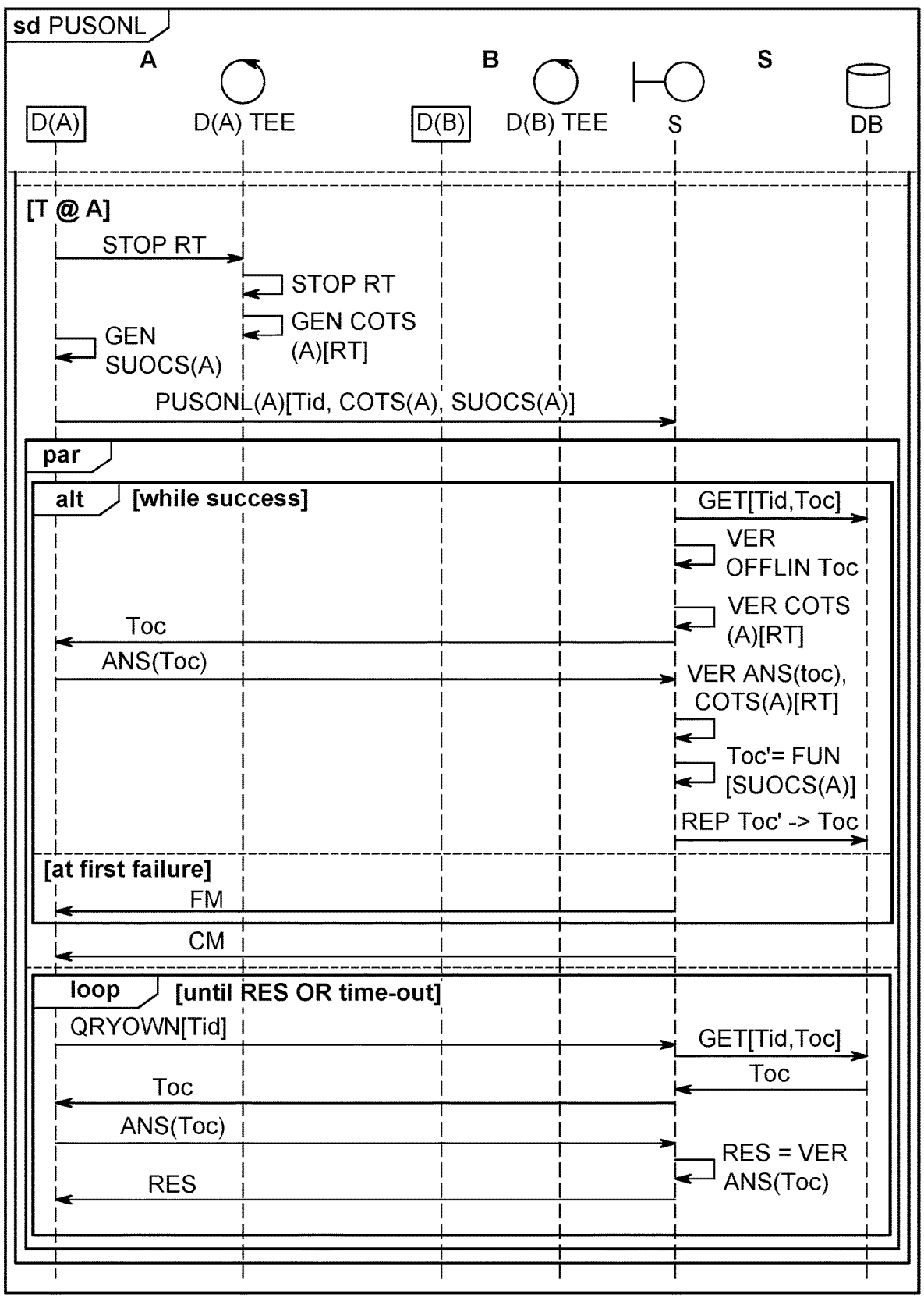
FIG. 6B is a continuation of FIG. 6A.

FIG. 6A-B illustrate an embodiment of the operations of stopping a running token RT and pushing online a corresponding transfer request PUSONL by a device D(B) of a controller CB having received a token from a controller CA of a device D(A) according to the invention. Upon stopping STOP RT to run the offline token RT by the TEE of the device D(B) of controller CB:

the TEE of the device D(B) of controller CB generates GEN COTS(B)[RT] a checkable one-time signature COTS(B) [RT] proving that the offline token RT has been stopped, the device D(B) generates GEN SUOCS (B) a single use ownership signature SUOCS(B) proving the controller B is the owner of the running token, and the device D(B) pushes online to the server S a transfer request PUSONL(B)[Tid, COTS(B), SUOCS (B)] containing the token unique identifier Tid of the (stopped) token, the checkable one-time signature COTS(B) and the single use ownership signature SUOCS(B);

upon reception of said transfer request PUSONL(B), the server S checks that the transfer request PUSONL(B) is valid by performing the following steps of (see the sub-diagram "alt [while OK]" of FIG. 6A):

a) checking that the token having the received token unique identifier Tid is indeed offline. The server S obtains from the database GET[Tid, Toc] the token ownership challenge Toc corresponding to the Tid. Then, the server S verifies VER OFFLIN Toc that the corresponding token is indeed offline.

b) verifying that the received checkable one-time signature COTS(B) is valid and, then, in case it is valid, challenging ownership of the token Tid by sending online the obtained token ownership challenge Toc to the device D(B). Upon reception of the token ownership challenge Toc, the device D(B) sends back a corresponding response ANS(Toc) to the server S, and the server S verifies VER ANS(Toc) the received response to the token ownership challenge Toc and the received checkable one-time signature VER COTS(B). In case both ANS(Toc) and COTS(B) are valid, the server S generates Toc'=FUN[SUOCS(B)] a new token ownership challenge Toc' as a function of the received single use ownership signature SUOCS(B) for the controller CB, and replaces REP Toc'— Toc in the database DB the token ownership challenge Toc by the new token ownership challenge Toc' indicating the new owner of the token corresponding to the Tid is controller CB, and sends a corresponding confirmation message CM to the device D(B).

The controller CB of the device D(B) can check whether the server S has indeed changed the ownership of the transferred token having the token unique identifier Tid (see the sub-diagram "loop [until RES OR time-out]" of FIG. 6A) by sending a corresponding ownership query QRYOWN[Tid].

An advantage of the above offline transfer according to the invention is that, in case the token ownership challenge Toc of the running token RT has been changed to the token ownership challenge Toc' in favor or controller CB, both controller CA and controller CB have a copy of the running token RT in their respective TEE, but only controller CB can prove having ownership. Thus, the running token RT cannot be further used (or transferred) by controller CA, and may only be used by controller CB to control operations corresponding to the token assigned data (performed via the device D(B)).

A further advantage of the above offline transfer according to the invention is that the controller CA, after the change of token ownership in favor of controller B, has interest in stopping the (copy of the) running token and delete it in order to save energy (e.g. of a battery) of the device D(A).

In a preferred mode, the TEE of the device D(B) of controller B performs the above operation of checking (ii) that the token T is owned by controller CA via zero knowledge proof protocol ZKP at the device D(B) of controller CB in offline communication (i.e. by communication through the local communication link CL) with the TEE of the device D(A) of controller CA. Thus, only controllers CA and CB of the devices D(A) and D(B) know that there is an ongoing transfer of token T, while the server S only knows that token T is running offline.

Also, in a preferred mode, the TEE of the device D(B) of controller B performs the above operation of checking (iii) that the token T is indeed running in the trusted execution environment TEE of the device D(A) of controller A via dynamical systems state synchronization/reconstruction (see [12], [13]) and zero-knowledge proof ZKP for TEE signature at the device D(B) of controller B in offline communication with the communication unit of the device D(A) of controller A.

The aim of the proof of running is to avoid some simple frauds/attacks which would enable "double use" of a token, namely copy and replay:

Copy: a dynamical token prevents the double use by preventing the validity of a simple static copy, which can be obtained e.g. when exposing the token to be used to device B; i.e. by controller A impersonating controller B to get a second copy of the token on controller A ownership.

Replay: even with a dynamical token, to prevent double use, it is necessary to prevent fast forward and replay attacks, these are aimed at creating a token copy usable within a limited lapse of time; i.e. speedily precompute the future states of the token advancing time of a given number of minutes, and then use both the original token and the fast-forwarded copy by replaying it (at the right speed) within said number of minutes.

Hence, a proof of running must satisfy the following requirements:

as always in cryptography, the cryptographic computations of the proof of running must be hard to compute/forge but sufficiently easy to verify;

must be verifiable (computational complexity) largely within the time slot of its validity;

its validity time slot must be comparable to the execution time of an offline transfer (e.g. from seconds to tens of seconds), so to prevent multiple parallel/sequential use (a variant of the replay attack);

the proof must ensure that the token has run the required number of steps/iterations since the token has been fetched offline, so to prove a part of its validity (there are still the proof of signature by the server and the proof of ownership signatures further to it);

the method shall prevent fast-forward and replay attacks.

Known solutions addressing requirements very similar to those exposed here are encountered (under different names) in some other use cases, for example:

Mobile phone based non gated mass transit ticketing (see [14], [15], [16]), where various solutions have been proposed to prove that the ticketing/metering Trusted Application (TA, see [17]) has never been stopped along the trip even when off-line; most of the solutions rely on dedicated ever increasing registers within the TEE;

Proof of elapsed time in permissioned blockchain consensus protocols (see [18][19][20]), where a solution capitalizing on Intel's trusted execution environment (SGX) has been proposed so to ensure two things: 1) that the participating nodes genuinely select a time that is indeed random and not a shorter duration chosen purposely by the participants in order to win, and 2) the winner has indeed completed the waiting time; the latter being of interest here.

Here, for the purpose of an off-line enabled token, it is possible to mix and match these known solutions to construct various possible implementations of the proof of running, here follow several alternative embodiments.

a) TEE ever increasing register+TEE signature: this particular embodiment is fully analogous at some of the solutions used in ungated mass transit ticketing. In this simple case, the TEE provides a tamper evident register which is ever increasing with time at a fixed pace; when the token is fetched off-line the D(A) TEE receives and stores a signed (by the server S) time stamp of the fetching time and starts the counter (register). At validation time, the D(A) TEE exposes the server time stamp and the TEE signed value of the register; D(B) TEE verifies the server time stamp with the server public key and the register with the TEE public key, then it verifies that the value of the counter/register is compatible with the current time and fetch time: i.e. currentTime=fetchTime+countervalue*DT (with due tolerance), where DT is the sampling time at which the register is updated; hence, proving that the token trusted application in the TEE has never been stopped. This implementation is very simple, of very low computational cost both on generation and validation sides, on the other hand, however, it very hardly relies solely on the TEE hardware and trust model.

b) Non-trivial dynamical system+proof of elapsed time from TEE: this particular embodiment exploits the proof of elapsed time mechanisms already available in the art so as to prevent fast forwarding and replay attack and, at the same time, enables a fast validation of the non-trivial iterated dynamical system. In this case the proof of running consists of two parts: the initial (X(0)) and current state (X(n)) of a non-trivial dynamical systems (e.g. chaotic or pseudo-random generator of the form $X(n+1)=F(X(n), P)$, where $X(n)$ is the state at iteration n and P is a vector of control parameters, and the proof that it has been iterated at the right pace by the TEE, i.e. that each step from n to n+1 has been separated of a fixed amount of time DT. When the token is fetched off-line, the D(A) TEE receives and stores (signed by the server S): 1) time stamp of the fetching time as for the previous implementation; 2) a set of control parameters P defining the settings for the non-trivial dynamical system (bifurcation parameters); and 3) the initial condition X(0) of the dynamical system. The TEE uses the public key of the server S to verify the signature by the server and starts immediately iterating the dynamical system updating its state ($X(n+1)=F(X(n), P)$) at the fixed pace DT; alongside, for each update step the TEE generates a proof of the elapsed time DT prior executing the state update and join (AND operator) it within the total proof of elapsed time; the proof of elapsed time is composed of the number of iteration steps performed and the total amount of time elapsed, both signed by the TEE. At validation time, the D(A) TEE exposes: the server time stamp, parameter P, and initial condition X(0) (all signed by the server); and the current state X(n), the number of iterations n and the total elapsed time elapsedTime (all signed by the TEE). The D(B) TEE verifies the server information with the server public key and the TEE information with the TEE public key, then it verifies that the value of the proven elapsed time is compatible with the current time and fetch time (as in the previous embodiment currentTime=fetchTime+elapsedTime with due tolerance); finally, it rapidly iterates the dynamical system n times from X(0) to X(n) using the parameter P, and verifies that it obtains the very same current state as claimed by the TEE; hence, finally proving that the token trusted application in the TEE has executed as expected and has never been stopped.

This later implementation is slightly more complex than the previous embodiment, it remains of moderately low computational cost (still higher than the previous case) for both generation and validation sides, on the other hand however, it slightly moderates the root of trust in the TEE hardware (which still is the solely root of trust for the elapsed time) adding the further crossed check of the iterated non-trivial dynamical system, which links the root of trust to the server (verifiable received time stamp, X(0), and P) and to the integrity of the TEE (which has correctly computed the $X(n+1)=F(X(n), P)$ all along).

c) Light blockchain based fat token: this particular embodiment is a further development of the previous one aimed at reducing even further the exclusivity of the root of trust in the TEE hardware. For this implementation, the ingredients are essentially the same as the previous one where instead of a cumulative proof of the elapsed time and number of iteration steps, the TEE has to produce a (sufficiently hard to compute) proof of each performed iteration in the form of a blockchain, rooted on the information received from the server S at the fetch off-line time, and with a block for each iteration step. Once again, when the token is fetched off-line, the D(A) TEE receives and stores (signed by the server): 1) time stamp of the fetching time; 2) a set of control parameters P defining the settings for the non-trivial dynamical system; and 3) the initial condition X(0) of the dynamical system. The TEE uses the public key of the server to verify the signature by the server and: first, it creates the root node of the proof or running blockchain with the information received from the server, then it starts immediately iterating the dynamical system updating its state ($X(n+1)=F(X(n), P)$) and appending one block to the blockchain for each iteration step. Each block contains a link the previous block via the hash value of the previous block, the state of the dynamical system X(n), the current time stamp, and a nonce to solve a relatively easy cryptographic puzzle, so to have a proof of work, finally the block is signed by the TEE. The combination of the proof of work and the TEE signature prevent fast-forwarding computation within or outside the TEE. At validation time, the D(A) TEE exposes the whole blockchain computed till then, and the D(B) TEE, after validation of the signatures (server S and TEE) validates the proof of running validating the whole blockchain with standard blockchain validation techniques; hence, proving that the token trusted application in the TEE has executed as expected and has never been stopped.

This implementation largely moderate the root of trust in the TEE hardware integrity at the expense of a much larger computational complexity, both at generation and validation time, and both in term of computational power and memory. On the one hand, the cryptographic puzzle, even if simple to be compatible with the TEE computational power, still need to be solved within the dedicated time lapse. On the other hand, the token proof grows linearly in time. Assuming a block of about 75 bytes (16 bytes hash, 4×8 bytes state, 8 bytes timestamp, 2-3 bytes nonce, 16 bytes signature), and a sampling rate of about 10 seconds, in one week (which is a reasonable maximal span to keep offline a token) the proof of running will have grown to about 4 MB, a reasonable but still remarkable size, particularly accounting that this is true for each offline token.

According to the invention, an alternative embodiment related to proof of running without reconstruction is described below wherein it is required that it is possible to internally enforce and externally verify that a token is running and it is doing so within a TEE. To do that, the internal current state of the Trusted Application (TA) running a token shall be exposed from controller CA device D(A) TEE to controller CB device D(B), so that D(B) TEE can verify the consistency of the exposed state with the hypothesis that the token has been "running" since it has been fetched off-line, i.e. validate the proof or running. Depending on the chosen embodiment of the proof of running, the exposure and observation of the "running" state can be realized in two possible ways:

1. By exposing the dynamically changing state indirectly, and by resorting to dynamical systems reconstruction techniques to fully reconstruct (synchronize to) the internal state (see[12] [13]); or
2. By exposing the dynamically changing state directly, and hence observing it directly from the dedicated channel such as NFC, BT, BTLE, or display-to-camera communication.

The first case is of interest in case the running dynamical system behind the off-line token is designed to run at a higher pace (see above) than the pace at which the proof of running (temporal signature) is emitted. In this case it can be of interest to use dynamical system synchronization algorithms to reconstruct the (synchronize to the) fast changing dynamical system and to verify at lower pace that the state changing rule does indeed satisfy the two-fold proof of running: the fast changing rule is according to the law expected for this segment and the extracted parameters correspond to the temporal signature of the proof of running. The second case is of interest in the case the running dynamical system behind the off-line token and the emission of its proof of running are synchronous, in this case the whole information necessary for the validation of the proof of running is plainly exposed (transmitted) from device D(A) to device D(B) one via the chosen channel. For instance, the assumption that a renewed proof of running must be emitted every 10 seconds (a very reasonable pace), and that the data transmission and computation time shall be fairly shared, would result in the following maximum data exchange sizes:

NFC: ~256 KB
BTLE: ~640 KB
BT: 1.2 MB
Screen to camera (full HD camera 20 fps): ~3 Mb These are all abundantly reasonable amounts for all data exchange and verification for each proof of running implementation but the fat token. For this latter, only the Bluetooth, screen to camera, or combined connections would be viable.

According to an example of implementation of the invention, the changing state of the running token can be securely (i.e. without possibility of malicious interference by a third party, or even by controller A) exposed via the connection from the TEE of the device D(A) of controller A to an externalization peripheral (see above). Similarly, the state can be observed (from the exposure) by the TEE of the device D(B) of controller B securely (i.e. without possibility of malicious interference by a third party, or even by controller B). This specific implementation of zero-knowledge transfer method offers a maximum security with respect to any intrusion attempt.

Preferably, in the above offline transfer according to the invention, the controller A changes the token ownership challenge of the running token in favor of controller B via oblivious computing at the device D(A) of controller A in offline communication with the communication unit of the device D(B) of controller B.

FIG. 6B, sub-diagram "[T@A]", illustrates a case of the above offline transfer where the TEE of the device D(A) of controller CA failed in running the offline token of token unique identifier Tid, or prematurely stopped running the offline token (before its transfer to the controller CB). In this case:

the device D(A) indicates STOP RT to its TEE to stop running the token RT and the processing unit PU of the D(A) TEE generates GEN COTS(A)[RT] a checkable one-time signature COTS(A) proving that the offline token RT has been stopped, and the processing unit PU of the device D(A) of controller CA generates GEN SUOCS(A) a single use ownership signature SUOCS (A) corresponding to a token ownership challenge for controller CA;

the controller A sends to the server S, via the communication unit of the device D(A) through the communication network CN, a request PUSONL(A)[Tid, COTS (A), SUOCS(A)] indicating to the server S to put back online the offline token T having the token unique identifier Tid, together with the checkable one-time signature COTS(A) and the single use ownership signature SUOCS(A);

upon reception of said put back request PUSONL(A), the server S checks that the request PUSONL(A) is valid by performing the following steps:

1) the server S gets GET[Tid, Toc] the token owner challenge Toc of the token (see the sub-diagram "alt [while success]" of FIG. 6B) having the token unique identifier Tid from the database DB, and verifies VER OFFLIN Toc that the token is indeed offline, then
2) the server S sends the obtained challenge Toc to the device D(A) and verifies VER ANS(Toc), COTS(A) [RT] the response ANS(Toc) sent back by the device D(A) and the checkable one-time signature COTS(A), in case they are valid the server generates Toc'=Fun [SUOCS(A)] an ownership challenge Toc' for the controller CA based on the received single use ownership signature SUOCS(A), replaces in the database DB the stored token ownership challenge Toc for this token unique identifier Tid with the new token ownership challenge Toc', and sends a corresponding confirmation message CM to the device D(A). The controller CA of the device D(A) can check (see the sub-diagram "loop [until RES OR time-out]" of FIG. 6B) whether it indeed owns the offline token of token unique identifier Tid by sending via the communication unit of D(A) an ownership query QRYOWN[Tid] to the server S. In response to the query, the server S obtains GET[Tid, Toc] the corresponding Toc in DB and sends back the token ownership challenge Toc to D(A), verifies RES=VER ANS(Toc) the response ANS(Toc) of D(A) to this ownership challenge, and sends back to D(A) the result RES of this verification.

If any of the above verifications fails, the server S sends a corresponding failure message FM to the device D(A).

According to a further aspect, the above described invention allowing secure exchange of a token between two devices based on a combination of a running (digital) token (which makes any static or past copy of the token useless) together with cross-devices check functions, can also be used in a context of online/offline (i.e. on/off internet) exchange of digital value tokens (representing an amount of money) between two parties CA and CB. In this case, a controller may correspond to an owner of the digital value token (e.g. a person or a company), the devices D(A) and D(B) my correspond to respective mobile devices (e.g. smartphones, tablets . . . ) of the owners CA and CB and the server S may correspond to an authority (e.g. central bank) having mint the digital value token. In this case, the token data assigned by the server may correspond to a mere face value (amount of money) of the token together with the digital signature of the authority (as a proof of mint).

The above disclosed subject matter is to be considered illustrative, and not restrictive, and serves to provide a better understanding of the invention defined by the independent claims.

REFERENCES

[1] M. Sabt, M. Achemlal, A. Bouabdallah: "Trusted Execution Environment: Wat It is, and What It is Not", 14th IEEE International Conference on Trust, Security and Privacy in Computing and Communications, August 2015, Helsinki, Finland.
[2] https://en.wikipedia.org/wiki/Trusted_execution_environment (edited on 15 Nov. 2020, at 13:04 (UTC)).
[3] from Crypto Wiki: cryptowiki.net/index.php?title=Protocols_for_secure_communication_channels (27 Dec. 2014, at 21:54).
[4] S. Goldwasser, M. Bellare: "Lecture Notes on Cryptography", July 2008: http://www.cs.tufts.edu/comp/165/papers/Goldwasser-Bellare-notes-cryptography.pdf
[5] https://en.wikipedia.org/wiki/Digital_signature (edited on 14 Dec. 2020, at 00:29 (UTC)).
[6] https://en.wikipedia.org/wiki/Blind_signature (edited on 4 Jan. 2020, at 18:21 (UTC)).
[7] D. Chaum, EUROCRYPT '90: Proceedings of the workshop on the theory and application of cryptographic techniques on Advances in cryptology, February 1991, Pages 458-464.
[8] Wikipedia. "Signatures with efficient protocols", https://en.wikipedia.org/wiki/Signatures_with_efficient_protocols (edited on 14 Dec. 2020, at 02:13 (UTC)).
[9] Goldwasser S., Ostrovsky R. (1993) Invariant Signatures and Non-Interactive Zero-Knowledge Proofs are Equivalent. In: Brickell E. F. (eds) Advances in Cryptology—CRYPTO'92. CRYPTO 1992. Lecture Notes in Computer Science, vol 740. Springer, Berlin, Heidelberg. https://doi.org/10.1007/3-540-48071-4_16.
[10] Camenisch J., Lysyanskaya A. (2003) A Signature Scheme with Efficient Protocols. In: Cimato S., Persiano G., Galdi C. (eds) Security in Communication Networks. SCN 2002. Lecture Notes in Computer Science, vol 2576. Springer, Berlin, Heidelberg. https://doi.org/10.1007/3-540-36413-7_20.
[11] Knox, D. A. and Adams, C. "Digital credentials with privacy-preserving delegation", First published: 15 Jul. 2011, https://doi.org/10.1002/sec.213,
(see https://onlinelibrary.wiley.com/doi/full/10.1002/sec.213).
[12] https://en.wikipedia.org/wiki/State_observer (edited on 12 Nov. 2020, at 07:16 (UTC)).
[13] Kevin McGoff, Sayan Mukherjee, Natesh S. Pillai: "Statistical Inference for Dynamical Systems: A review". 2012. https://arxiv.org/pdf/1204.6265.pdf
[14] Ekberg, Jan-Erik & Kostiainen, Kari & Asokan, N. (2014): "The Untapped Potential of Trusted Execution Environments on Mobile Devices", Security & Privacy, IEEE. 12. 29-37. 10.1109/MSP.2014.38.
[15] Ekberg J E., Tamrakar S. (2012): "Mass Transit Ticketing with NFC Mobile Phones". In: Chen L., Yung M., Zhu L. (eds) "Trusted Systems". INTRUST 2011. Lecture Notes in Computer Science, vol. 7222. Springer, Berlin, Heidelberg.
[16] Tamrakar S., Ekberg J E. (2013): "Tapping and Tripping with NFC". In: Huth M., Asokan N., Čtapkun S., Flechais I., Coles-Kemp L. (eds) "Trust and Trustworthy Computing". Trust 2013. Lecture Notes in Computer Science, vol 7904. Springer, Berlin, Heidelberg.
[17] "TEE System Architecture v1.2"|GPD_SPE_009 Published December 2018. https://globalplatform.org/specs-library/tee-system-architecture-v1-2/
[18] Sawtooth v1.0.5 documentation: PoET 1.0 Specification, https://sawtooth.hyperledger.org/docs/core/releases/1.0/architecture/poet.html
[19] Medium: Understanding Hyperledger Sawtooth—Proof of Elapsed Time. Feb. 20, 2018 https://medium.com/kokster/understanding-hyperledger-sawtooth-proof-of-elapsed-time-e0c303577ec1
[20] G. Prisco. Intel Develops 'Sawtooth Lake' Distributed Ledger Technology For The Hyperledger Project. Bitcoin Magazine, Apr. 11, 2016. https://bitcoinmagazine.com/articles/intel-develops-sawtooth-lake-distributed-ledger-technology-for-the-hyperledger-project-1460397461

The invention claimed is:

1. A method for controlling a plurality of devices via a server connected with a database, each device being equipped with a processing unit, a communication unit, and a hardware trusted execution environment (TEE) having a memory and securely connected to the communication unit via a dedicated secure hardware pathway, and being controlled by a corresponding controller, the communication units being adapted to securely communicate with each other via a wireless or wired point to point communication link for offline communication, and the server being adapted to securely communicate with each device communication unit via a wired or wireless communication network for online communication, the server and the communication units being adapted to transfer data using encrypted protocols, the server and the TEE of each device being adapted to respond to a validation challenge via a zero-knowledge proof (ZKP) protocol, and to generate and validate a single use ownership digital signature and its corresponding ownership signature validation challenge,
wherein:
the database managed by the server stores digital tokens, each token delivered by the server comprising a token unique identifier, corresponding token data assigned by the server and including a server signature, and a token ownership challenge corresponding to a unique controller owning said token attributed by the server;
in case of offline transfer of a token owned by a controller A of a device to another controller B of another device, the controller A first sends an offline transfer request containing the token unique identifier and a TEE single use offline signature of the trusted execution environment of the device of controller A via online communication to the server by means of the communication unit of the device, upon reception of said offline transfer request the server checks that the token unique identifier is stored in the database with corresponding token ownership challenge and then, sends said token ownership challenge to the controller A, upon reception and verification of the token ownership challenge response from controller A the server verifies that the TEE single use offline signature is valid, in case said TEE single use offline signature is valid the server replaces the token ownership challenge corresponding to the token unique identifier with a TEE ownership challenge corresponding to the TEE single use offline signature and sends back a confirmation message indicating a successful replacement of token ownership challenge together with data necessary for the TEE of the device of controller A to start executing the token, in case said single use offline signature is not valid the server sends back a corresponding failure message corresponding to an invalid single use offline signature to controller A;

in case the controller A receives the confirmation message the TEE of the device of controller A starts executing the token and the communication unit of the device of controller A exposes the running token to the communication unit of the device of controller B which then continuously observes the running token, synchronizes with it in its trusted execution environment and checks that:
(i) the token is signed by the server,
(ii) the token owner is controller A, and
(iii) the token is running in the trusted execution environment of the device of controller A;
then the device of controller A changes the token ownership challenge of the running token in favor of controller B and the controller B continuously observes a copy of the token with the changed token ownership challenge in the trusted execution environment of its device, and
the TEE of the device of controller B stops running the token and generates a proof of stop, and the controller B then pushes online a transfer request containing the token unique identifier, the proof of stop and the changed token ownership challenge to the server, and upon reception of said transfer request the server checks that the request is valid and in case the request is valid it performs a corresponding change of token ownership challenge for this token in the database.

2. The method according to claim 1, wherein at step (ii) the TEE of the device of controller B checks that the token owner is controller A via zero knowledge proof ZKP protocol at the device of controller B in offline communication with the communication unit of the device of controller A.

3. The method according to claim 1, wherein at step (iii) the TEE of the device of controller B checks that the token is running in the trusted execution environment of the device of controller A via dynamical systems state synchronization/reconstruction and ZKP protocol for TEE signature at the device of controller B in offline communication with the communication unit of the device of controller A.

4. The method according to claim 1, wherein the controller A changes the token ownership challenge of the running token in favor of controller B via oblivious computing at the device of controller A in offline communication with the communication unit of the device of controller B.

5. The method according to claim 1, wherein upon stopping to run the offline token by the TEE of the device of controller B,
the TEE of the device of controller B generates a checkable one-time signature proving that the offline token has been stopped and containing a provable check of the original TEE single use offline signature, and the device of controller B generates a single use ownership challenge signature;

the controller B adds in the transfer request the checkable one-time signature, the provable check of the original TEE single use offline signature, and the single use ownership challenge signature, and pushes online the transfer request to the server; and upon reception of said transfer request, the server checks that the transfer request is valid by performing the following steps of:
checking that the token having the received token unique identifier is indeed offline, then, in case it is offline,
verifying that the received one-time signature is valid and, then, in case it is valid, challenging ownership via the received original TEE single use offline signature, then
checking that the received single use ownership challenge signature is valid, and, in case it is valid, replacing in the database the stored token ownership challenge for this token unique identifier with the received changed token ownership challenge.

6. The method according to claim 1, wherein in case the TEE of the device of controller A fails in running the token, or stops running the token before its transfer to the device of controller B,
the TEE of the device of controller A generates a checkable one-time signature proving that the offline token has been stopped, and the device of controller A generates a single use ownership challenge signature corresponding to a new token ownership challenge for controller A;
the controller A sends to the server a put back request indicating to the server to put back online the token, together with the checkable one-time signature and the single use ownership challenge signature;
upon reception of said put back request the server checks that the request is valid by performing the following steps of:
verifying that the token is indeed offline, then
challenging the original single use offline signature and then verifying that the received one-time signature is valid and, in case it is valid and upon verifying that the received single use ownership challenge signature is indeed valid, replacing in the database the stored token ownership challenge for this token unique identifier with the new token ownership challenge.

7. The method according to claim 1, wherein in case of online transfer of a token owned by a controller A of a device to another controller B of another device, the transfer involves sending by the controller A to the controller B the token unique identifier of the token to be transferred, via the communication unit of the device, sending back by controller B of a single use ownership challenge signature of controller B via the communication unit of the another device, sending by the controller A a transfer request to the server specifying the token unique identifier and the received single use ownership challenge signature of controller B, upon reception of said transfer request the server checks that the token unique identifier is stored in the database with corresponding token ownership challenge and then, sends said token ownership challenge to the controller A, upon reception and verification of the ownership response from controller A the server verifies that the single use ownership signature of controller B in the transfer request is valid, in case said single use ownership signature is valid the server replaces the token ownership challenge corresponding to the token unique identifier with a token ownership challenge corresponding to controller B and sends back a confirmation of transfer to the controller A, in case said single use ownership signature is not valid the server sends back a failure of transfer message to controller A.

8. A system for controlling a plurality of devices via a server connected with a database, each device being equipped with a processing unit, a communication unit, and a hardware trusted execution environment (TEE) having a memory and securely connected to the communication unit via a dedicated secure hardware pathway, and being controlled by a corresponding controller, the communication units being adapted to securely communicate with each other via a wireless or wired point to point communication link for offline communication, and the server being adapted to securely communicate with each device communication unit via a wired or wireless communication network for online communication, the server and the communication units being adapted to transfer data using encrypted protocols, the server and the TEE of each device being adapted to respond to a validation challenge via a zero-knowledge proof (ZKP) protocol, and to generate and validate a single use ownership digital signature and its corresponding ownership signature validation challenge,
wherein:
the server is adapted to deliver digital tokens and store the delivered tokens in the database, each token delivered by the server comprising a token unique identifier, corresponding token data assigned by the server and including a server signature, and a token ownership challenge corresponding to a unique controller owning said token attributed by the server;
the system is configured such that in order to perform an offline transfer of a token owned by a controller A of a device to another controller B of another device,
the controller A first sends an offline transfer request containing the token unique identifier and a TEE single use offline signature of the trusted execution environment of the device of controller A via online communication to the server by means of the communication unit of the device;
upon reception of said offline transfer request the server checks that the token unique identifier is stored in the database with corresponding token ownership challenge and then, sends said token ownership challenge to the controller A;
upon reception and verification of the token ownership challenge response from controller A the server verifies that the TEE single use offline signature is valid, in case said TEE single use offline signature is valid the server replaces the token ownership challenge corresponding to the token unique identifier with a TEE ownership challenge corresponding to the TEE single use offline signature and sends back a confirmation message indicating a successful replacement of token ownership challenge together with data necessary for the TEE of the device of controller A to start executing the token, in case said single use offline signature is not valid the server sends back a corresponding failure message corresponding to an invalid single use offline signature to controller A;
in case the controller A receives the confirmation message the TEE of the device of controller A starts executing the token and the communication unit of the device of controller A exposes the running token to the communication unit of the device of controller B which then continuously observes the running token, synchronizes with it in its trusted execution environment and checks that:
(i) the token is signed by the server,
(ii) the token owner is controller A, and
(iii) the token is running in the trusted execution environment of the device of controller A;
then the device of controller A changes the token ownership challenge of the running token in favor of controller B and the controller B continuously observes a copy of the token with the changed token ownership challenge in the trusted execution environment of its device, and
the TEE of the device of controller B stops running the token and generates a proof of stop, and the controller B then pushes online a transfer request containing the token unique identifier, the proof of stop and the changed token ownership challenge to the server, and
upon reception of said transfer request the server checks that the request is valid and in case the request is valid it performs a corresponding change of token ownership challenge for this token in the database.

9. The system according to claim 8, wherein to perform the operation of checking (ii) that the token owner is controller A, the TEE of the device of controller B is configured to check that the token owner is controller A via zero knowledge proof ZKP protocol at the device of controller B in offline communication with the communication unit of the device of controller A.

10. The system according to claim 8, wherein to perform the operation of checking (iii) that the token is running in the trusted execution environment of the device of controller A, the TEE of the device of controller B is configured to check that the token is running in the trusted execution environment of the device of controller A via dynamical systems state synchronization/reconstruction and ZKP protocol for TEE signature at the device of controller B in offline communication with the communication unit of the device of controller A.

11. The system according to claim 8, wherein the controller A is configured to change the token ownership challenge of the running token in favor of controller B via oblivious computing at the device of controller A in offline communication with the communication unit of the device of controller B.

12. The system according to claim 8, wherein the system is configured such that upon stopping to run the offline token by the TEE of the device of controller B,
the TEE of the device of controller B generates a checkable one-time signature proving that the offline token has been stopped and containing a provable check of the original TEE single use offline signature, and the device of controller B generates a single use ownership challenge signature;
the controller B adds in the transfer request the checkable one-time signature, the provable check of the original TEE single use offline signature, and the single use ownership challenge signature, and pushes online the transfer request to the server via the communication unit of the device of controller B; and
upon reception of said transfer request, the server checks that the transfer request is valid by performing the following operations of:
checking that the token having the received token unique identifier is indeed offline, then, in case it is offline, verifying that the received one-time signature is valid and, then, in case it is valid, challenging ownership via the received original TEE single use offline signature, then checking that the received single use ownership challenge signature is valid, and, in case it is valid, replacing in the database the stored token ownership challenge for this token unique identifier with the received changed token ownership challenge.

13. The system according to claim 8, wherein the system is configured such that in case the TEE of the device of controller A fails in running the token, or stops running the token before its transfer to the device of controller B:

the TEE of the device of controller A generates a checkable one-time signature proving that the offline token has been stopped, and the device of controller A generates a single use ownership challenge signature corresponding to a new token ownership challenge for controller A;

the controller A sends to the server a put back request indicating to the server to put back online the token, together with the checkable one-time signature and the single use ownership challenge signature, via online communication by means of the communication unit of the device of controller A;

upon reception of said put back request the server checks that the request is valid by performing the following operations of:

verifying that the token is indeed offline, then challenging the original single use offline signature and then verifying that the received one-time signature is valid and, in case it is valid and upon verifying that the received single use ownership challenge signature is indeed valid, replacing in the database the stored token ownership challenge for this token unique identifier with the new token ownership challenge.

14. The system according to claim 8, wherein the system is configured such that in case of online transfer of a token owned by a controller A of a device to another controller B of another device, the transfer is carried out by performing the following operations:

sending by the controller A to the controller B the token unique identifier of the token to be transferred, via offline communication between the communication units of the device of controller A and the device of controller B, sending back by controller B of a single use ownership challenge signature of controller B via offline communication between the communication units of the device of controller B and the device of controller A, sending by the controller A a transfer request to the server specifying the token unique identifier and the received single use ownership challenge signature of controller B, via online communication by means of the communication unit of the device of controller A, upon reception of said transfer request the server checks that the token unique identifier is stored in the database with corresponding token ownership challenge and then, sends said token ownership challenge to the controller A, via online communication with the communication unit of the device of controller A, upon reception, via online communication with the communication unit of the device of controller A, and verification of the ownership response from controller A the server verifies that the single use ownership signature of controller B in the transfer request is valid, and in case said single use ownership signature is valid the server replaces the token ownership challenge corresponding to the token unique identifier with a token ownership challenge corresponding to controller B and sends back a confirmation of transfer to the controller A via online communication with the communication unit of the device of controller A, in case said single use ownership signature is not valid the server sends back a failure of transfer message to controller A via online communication with the communication unit of the device of controller A.

* * * * *